(12) United States Patent
Wu et al.

(10) Patent No.: US 11,165,229 B2
(45) Date of Patent: Nov. 2, 2021

(54) SWITCH SEAT BODY ASSEMBLING STRUCTURE

(71) Applicants: SWITCHLAB INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Chih-Hao Sung, New Taipei (TW); Chih-Kai Hsu, New Taipei (TW)

(73) Assignees: Switchlab, Inc.; Switchlab (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/816,487

(22) Filed: Mar. 12, 2020

(65) Prior Publication Data
US 2020/0295542 A1 Sep. 17, 2020

(30) Foreign Application Priority Data
Mar. 14, 2019 (TW) .................. 108108690

(51) Int. Cl.
*H01H 1/48* (2006.01)
*H01H 9/02* (2006.01)
*H01H 11/00* (2006.01)
*H02B 1/48* (2006.01)

(52) U.S. Cl.
CPC .............. *H02B 1/48* (2013.01); *H01H 9/02* (2013.01); *H01H 11/00* (2013.01)

(58) Field of Classification Search
CPC . H02B 1/48; H02B 1/044; H01H 9/02; H01H 11/00; H01H 11/06; H01H 2239/038; H01H 13/50; H01H 13/04
USPC .......... 200/293, 412, 50.36, 296, 302.1, 531
See application file for complete search history.

(56) References Cited

U.S. PATENT DOCUMENTS

| | | | | |
|---|---|---|---|---|
| 3,829,599 A | * | 8/1974 | Fujioka | H02B 1/044 174/503 |
| 5,041,707 A | * | 8/1991 | Anderson | H01H 9/02 200/305 |
| 5,201,408 A | * | 4/1993 | Torma | H02B 1/044 200/292 |
| 6,509,823 B2 | * | 1/2003 | Meckler | H02B 1/044 200/293 |
| 6,717,082 B1 | * | 4/2004 | Wu | H01H 13/063 200/302.2 |

(Continued)

*Primary Examiner* — William A Bolton
(74) *Attorney, Agent, or Firm* — Rosenberg, Klein & Lee

(57) ABSTRACT

A switch seat body assembling structure includes a main body for assembling with a switch component. The main body is composed of a metal head section in the form of a thin sheet structure and a nonmetal belly section. The main body is defined with an eccentric axis and has a shaft hole positioned on the eccentric axis. The metal head section has a first wall normal to or inclined from the eccentric axis and a second wall connected with the first wall and parallel to or inclined from the eccentric axis. The first and second walls together define a space. The nonmetal belly section fills the space to connect with entire sections of the first and second walls as an integrated body. The switch seat body assembling structure improves the problems that the processing and manufacturing processes are time-consuming and troublesome and the material cost is higher.

40 Claims, 26 Drawing Sheets

(56) References Cited

U.S. PATENT DOCUMENTS

| | | | | |
|---|---|---|---|---|
| 7,279,649 B2 * | 10/2007 | Shiroshita | .............. | H01H 3/161 200/302.1 |
| 2006/0191703 A1 * | 8/2006 | Charrier | ................ | H02B 1/044 174/68.1 |
| 2015/0279584 A1 * | 10/2015 | Vitan | ..................... | H01H 13/86 200/293 |

* cited by examiner

SWITCH SEAT BODY ASSEMBLING STRUCTURE

BACKGROUND OF THE INVENTION

1. Field of the Invention

The present invention relates generally to a switch seat body assembling structure, and more particularly to a switch seat body assembling structure including a complex switch seat main body composed of a metal head section in the form of a thin sheet structure and a nonmetal belly section. The nonmetal belly section is connected with the metal head section as an integrated body.

2. Description of the Related Art

A conventional switch or switch indication device is applied to an electrical, electronic or automatic control system for an operator to know the working or power-on/off state of the machine. Such switch device includes a seat body or main body, internal switch components and multiple sets of terminal pins arranged in a chamber defined by the seat body. The terminal pins extend out of the chamber or the seat body to connect with electrical conductive wire or insert on a circuit board to achieve electrical connection. A light source is disposed in the chamber of the seat body and electrically connected with a set of positive/negative electrode contact pins of the terminal pins. A slightly transparent maintenance or pushbutton switch is mounted on upper section of the chamber of the seat body, whereby an operator can know the working or power-on/off state of the machine through the maintenance or pushbutton switch, which makes the light source emit light or not emit light.

With respect to the manufacturing and structural design of this sort of switch device, the conventional switch seat body or main body is entirely made of metal material as a cylindrical body with an internal chamber. The outer surface of the seat body is partially lathed/milled and processed to form a thread. After the internal switch components are assembled in the internal chamber of the seat body, the seat body is pressurized and forcedly deformed so as to secure the seat body with the internal switch components to form the switch device.

As well known by those who are skilled in this field, the manufacturing, assembling, processing and securing operation of the seat body of the above embodiment are more troublesome and time-consuming. As a result, the manufacturing cost is increased.

Still with respect to the structural design and operation application of the seat body of the switch device, the seat body is selectively made of metal material because when the seat body of the switch device is mounted on the panel or substrate for an operator to operate, the seat body can have sufficient structural hardness to resist against the outward destroying force created in operation. For example, the substrate applies reaction force to the seat body to cause wear and damage of the surface structure of the seat body and make the seat body loosen from the substrate. This is not what we expect.

An improved conventional switch seat body structure has been disclosed, which employs a metal head section and a nonmetal belly section connected with the head section to improve the problem that the operation is troublesome and time-consuming and provide sufficient structural hardness to resist against the outward destroying force created in operation.

The embodiment includes a main body for assembling with the internal switch components. The main body is composed of a metal head section and a nonmetal belly section. The metal head section has a shoulder section and a skirt section connected with the shoulder section (and/or the skirt section is formed with a recessed section and a subsidiary shoulder section). The shoulder section and the skirt section together define a shaft hole. The shoulder section protrudes toward outer side of the metal head section and the skirt section axially extends toward the nonmetal belly section. In addition, in cooperation with a molding module, the nonmetal belly section material is filled in to connect with at least a part of the skirt section (and/or recessed section and subsidiary shoulder section). Accordingly, the nonmetal belly section and the metal head section are integrally connected.

With respect to the structure and manufacturing of the above embodiment, the metal head section must be made from an entire metal column body by means of lathing/milling the metal column body into a cylindrical body structure. In cooperation with a miller and/or a drilling machine, most of the material of the metal cylindrical body structure is removed to manufacture the shaft hole form for mounting the switch (pushbutton).

It should be noted that the main body structure and manufacturing process of the above embodiment need to be further improved so as to shorten the manufacturing time and solve the problems that the manufacturing process is troublesome, a great amount of waste metal material is produced to affect the cost and the environment is contaminated. In this case, the switch industry can be upgraded.

To speak representatively, the above references reveal some shortcomings of the seat body or the main body and the relevant connection components of the conventional switch device in use and structural design. In case the structures and the application conditions of the seat body or the main body and the relevant components are redesigned to be different from the conventional switch device, the use form of the switch device can be changed to be different from the conventional switch device.

For example, in the condition that the seat body or the main body is manufactured to have sufficient structural hardness or strength to resist against the outward destroying force (or external action force) so as to reduce the wear and damage of the surface structure of the seat body, in comparison with the conventional switch device, the present invention can improve or eliminate the shortcoming of the conventional switch device that the metal head section must be made by means of lathing/milling to form the shaft hole. In this case, the problems of the conventional switch device that the manufacturing process is time-consuming and troublesome, a great amount of waste metal material is produced and the cost is higher are solved. Furthermore, the manufacturing process of the seat body (or the main body) is simplified to form multiple structural forms (and/or figures or characters with decoration/indication effect). Therefore, in accordance with the actual use situation, an operator can selectively use different main body structure with different structural form to widen the application range of the switch device. All the above issues are not substantially taught, suggested or disclosed in the above references.

SUMMARY OF THE INVENTION

It is therefore a primary object of the present invention to provide a switch seat body assembling structure including a main body for assembling with a switch component. The main body is composed of a metal head section in the form of a thin sheet structure and a nonmetal belly section. The main body is defined with an eccentric axis and has at least one shaft hole positioned on the eccentric axis. The metal head section has a first wall normal to or inclined from the eccentric axis and a second wall connected with one end of the first wall and parallel to or inclined from the eccentric axis. The first and second walls together define a space therebetween. The nonmetal belly section fills the space to connect with entire sections of the first and second walls as an integrated body. In condition that the switch seat body can resist against the outward destroying force and the manufacturing process is simplified, the shortcomings of the conventional switch device that the processing and manufacturing operation is time-consuming and troublesome the material cost is higher are improved.

In the above switch seat body assembling structure, the eccentric axis is defined with reference to the main body. The eccentric axis deviates from the central position of the main body and defined as the eccentric axis.

In the above switch seat body assembling structure, the first and second walls of the metal head section (or the main body) contain an angle, which is an acute angle, a right angle or an obtuse angle. The first and second walls together define multiple shaft holes having geometrical configurations. The second wall is formed with multiple assembling sections. The assembling sections have the form of protruding plate body structure or hole structure for enhancing the connection effect between the second wall and the nonmetal belly section.

The present invention can be best understood through the following description and accompanying drawings, wherein:

DETAILED DESCRIPTION OF THE PREFERRED EMBODIMENTS

Figure 1:
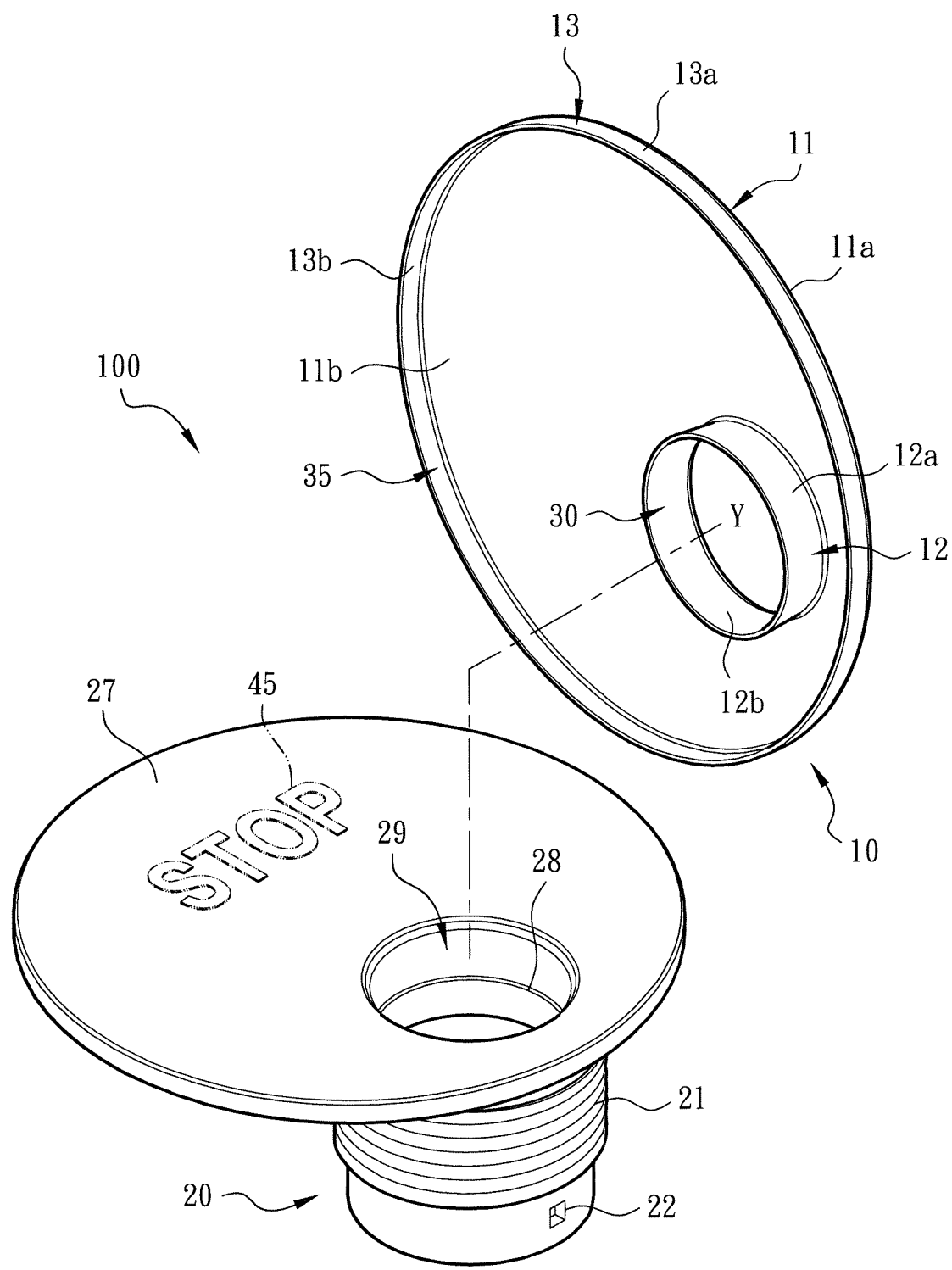
FIG. 1 is a perspective exploded view of the present invention, showing the structures of the metal head section and the nonmetal belly section of the main body.
Figure 2:
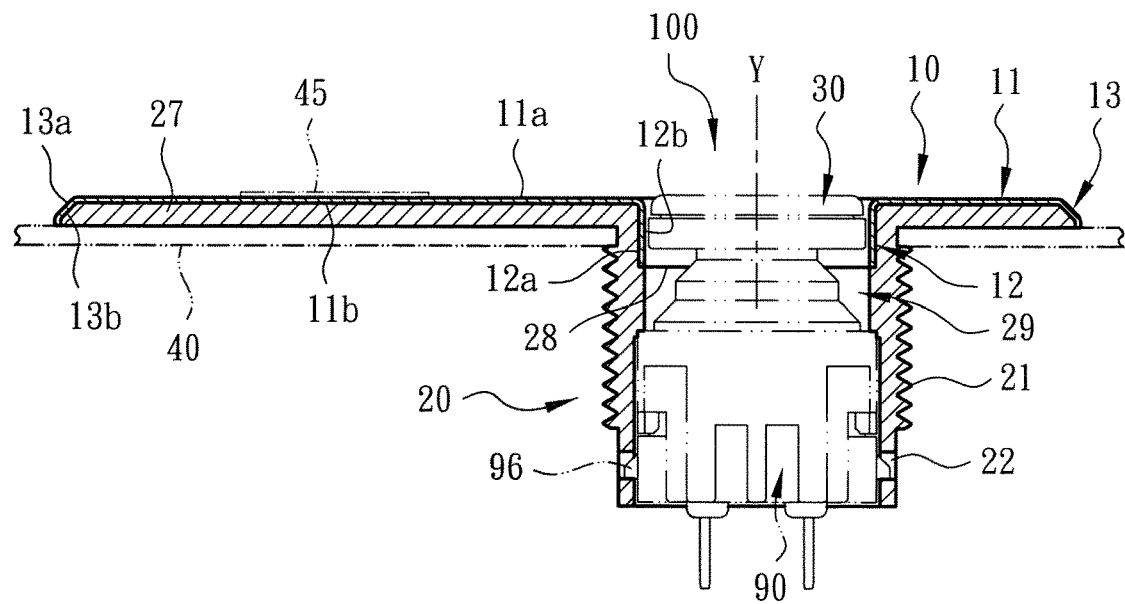
FIG. 2 is a plane sectional view of the present invention, showing that the metal head section and the nonmetal belly section of the main body are connected with each other, in which the phantom lines show that the main body is assembled with the substrate and the switch component.

Please refer to FIGS. 1 and 2. The switch seat body assembling structure of the present invention includes a switch seat main body 100 for assembling with a switch component 90 (or wire connection terminal) to form a switch device or switch assembly. In a preferred embodiment, the main body 100 is composed of a metal head section 10 in the form of a thin sheet structure and a nonmetal belly section 20. The main body 100 is defined with an eccentric axis y with reference to the main body 100. The eccentric axis y deviates from the central position of the main body 100 and defined as the eccentric axis.

In the description hereinafter, the upper section, upper side, lower section, lower side, outer section, outer side, inner section, inner side, etc. mentioned are recited with the direction of the drawings as the reference direction.

In a preferred embodiment, the metal head section 10 is made from a metal thin sheet by means of directly pressing the metal thin sheet. The metal head section 10 has a first wall 11 normal to (or inclined from) the eccentric axis y and a second wall 12 connected with one end of the first wall 11 in parallel to (or inclined from) the eccentric axis y to together define at least one shaft hole 30 positioned on the eccentric axis y.

It should be noted that the thin sheet structure configuration of the metal head section 10 permits the metal head section 10 (and/or the shaft hole 30) to be pressed into various geometrical configurations or structures according to the use requirements, (for example, circular shape, elliptic shape, triangular shape, square shape, rectangular shape, polygonal shape, irregular shape, etc.) In addition, the first wall 11 and the second wall 12 of the metal head section 10 (or the main body 100) contain an angle. The angle is an acute angle, a right angle or an obtuse angle.

In a preferred embodiment, the other end of the first wall 11 is selectively formed and connected with a subsidiary wall 13. The subsidiary wall 13 is formed in such a manner that the other end of the first wall 11 is (arched) bent toward the lower side of the drawing to extend in a direction in parallel to (or inclined from) the eccentric axis y. In addition, the first wall 11, the second wall 12 and the subsidiary wall 13 (in accordance with the direction shown in the drawing) are respectively defined with outer surfaces 11a, 12a, 13a and inner surfaces 11b, 12b, 13b.

FIG. 1 especially shows that the first wall 11 or the inner surface lib of the first wall (and the subsidiary wall 13 or the inner surface 13b of the subsidiary wall) and the second wall 12 or the outer surface 12a of the second wall together define a space 35. The nonmetal belly section 20 is made of plastic or the like material by means of the molding module to fill in the space 35 and entirely connect with the first wall 11 (or the inner surface lib of the first wall) and the second wall 12 (or the outer surface 12a of the second wall) and/or the subsidiary wall 13 (or the inner surface 13b of the subsidiary wall). The nonmetal belly section 20 extends toward the lower side of the drawing in a direction in parallel to the eccentric axis y so as to integrally connect with the metal head section 10. In this case, the structure of the metal head section 10 and the structure of the nonmetal belly section 20 can reinforce each other as shown in FIG. 2.

As shown in the drawings, the nonmetal belly section 20 is a column-shaped body structure with a thread 21 on the surface. The nonmetal belly section 20 defines an internal space 29 in cooperation with the shaft hole 30 of the metal head section 10 for assembling with the switch component 90 as shown in FIG. 2. In addition, a shoulder section 28 is disposed in the internal space 29 of the nonmetal belly section 20 for regulating the assembling position of the metal head section 10 and the nonmetal belly section 20 to help in locating the metal head section 10.

It should be noted that the nonmetal belly section 20 is formed with a tray section 27 for filling the space 35. The tray section 27 is correspondingly connected with the first wall 11 of the metal head section, whereby the first wall 11 encloses the shaft hole 30. The area of the first wall 11 (or the tray section 27) can be smaller than, equal to or larger than the (cross-sectional) area of the shaft hole 30.

The phantom lines of FIG. 2 show the assembly of the main body 100 and the substrate 40. When the main body 100 and the substrate 40 are assembled for an operator to operate and use, the nonmetal belly section 20 cooperates with the subsidiary wall 13 of the metal head section 10 to press and connect with the substrate 40 to achieve a secure assembling effect, (especially the first wall 11 and the tray section 27 will connect with the substrate 40 by a large area). Accordingly, the switch seat body (or the main body 100) can resist against the outward destroying force. Therefore, in condition that the manufacturing process is simplified, the shortcomings of the conventional switch device that the processing and manufacturing operation is time-consuming and troublesome the material cost is higher can be improved.

It should be noted that the first wall 11 of the metal head section 10 provides a large-area section, on which a plane (or solid or hollow) figure (or character) section can be arranged or printed or stamped to achieve decoration and/or indication effect.

The phantom lines of FIG. 2 also show that the switch component 90 is assembled in the main body 100 (including the shaft hole 30 of the metal head section 10 and the internal space 29 of the nonmetal belly section 20).

Figure 3:
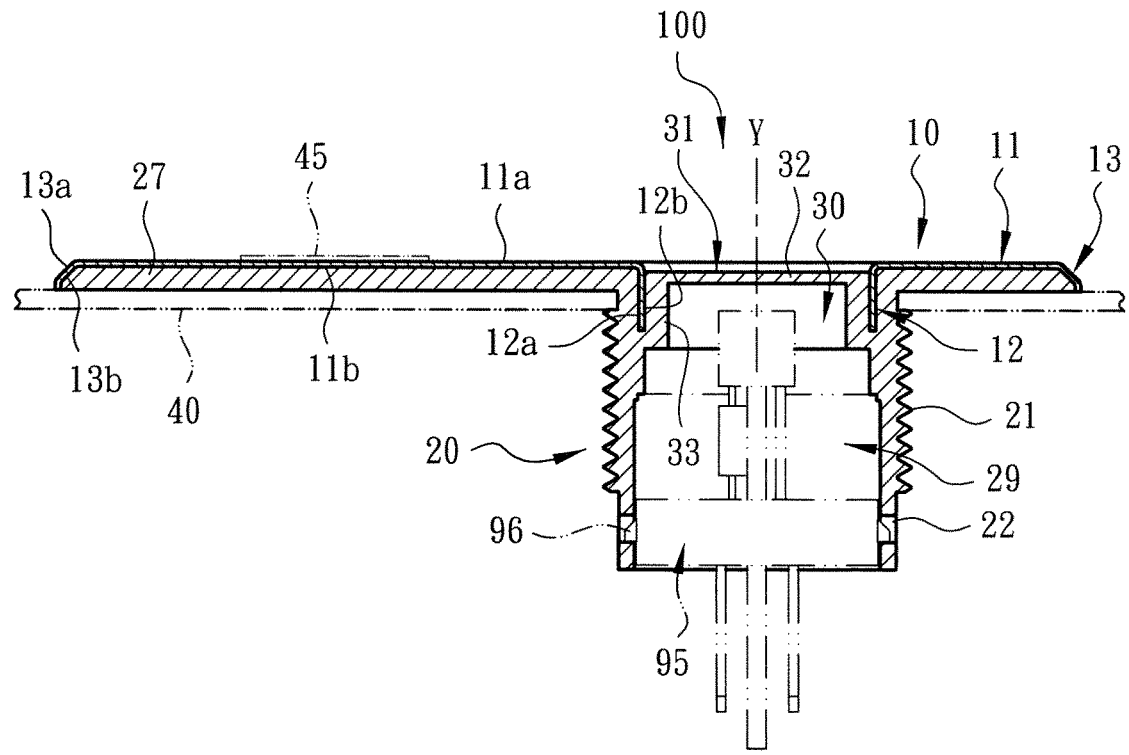
FIG. 3 is a plane sectional view of a preferred embodiment of the present invention, in which the phantom lines show that the main body is assembled with a light source component (such as an LED component)

Please now refer to FIG. 3. A light source component 95 (such as LED component) is mounted in the main body 100 or the internal space 29 of the nonmetal belly section 20 as shown by the phantom lines of the drawing.

In a preferred embodiment, the nonmetal belly section 20 of the main body 100 is formed with a restriction section 22 in the form of a hole structure (or protrusion structure). The switch component 90 (or the light source component 95) has an insertion section 96 in the form of a protrusion structure (or hole structure). The restriction section 22 is correspondingly assembled with the insertion section 96, whereby the switch component 90 (or the light source component 95) is securely assembled in the main body 100. As shown in FIG. 3, a closure body 31 is disposed in the shaft hole 30 of the metal head section 10. The closure body 31 is selectively made of plastic material or the like material to form a structure with a U-shaped cross section. Basically, the closure body 31 can be alternatively integrally formed with the nonmetal belly section 20.

As shown in the drawing, the closure body 31 includes a base section 32 on the upper side and a wall section 33 perpendicularly connected with the base section 32. The wall section 33 cooperates with the nonmetal belly section 20 to respectively compress the inner surface 12b and outer surface 12a of the second wall 12 of the metal head section, whereby the nonmetal belly section 20 encloses the second wall 12 to achieve securer connection effect.

In a preferred embodiment, the base section 32 and/or wall section 33 of the closure body 31 can be transparent so that the light source component 95 can emit light through the closure body 31.

Figure 4:
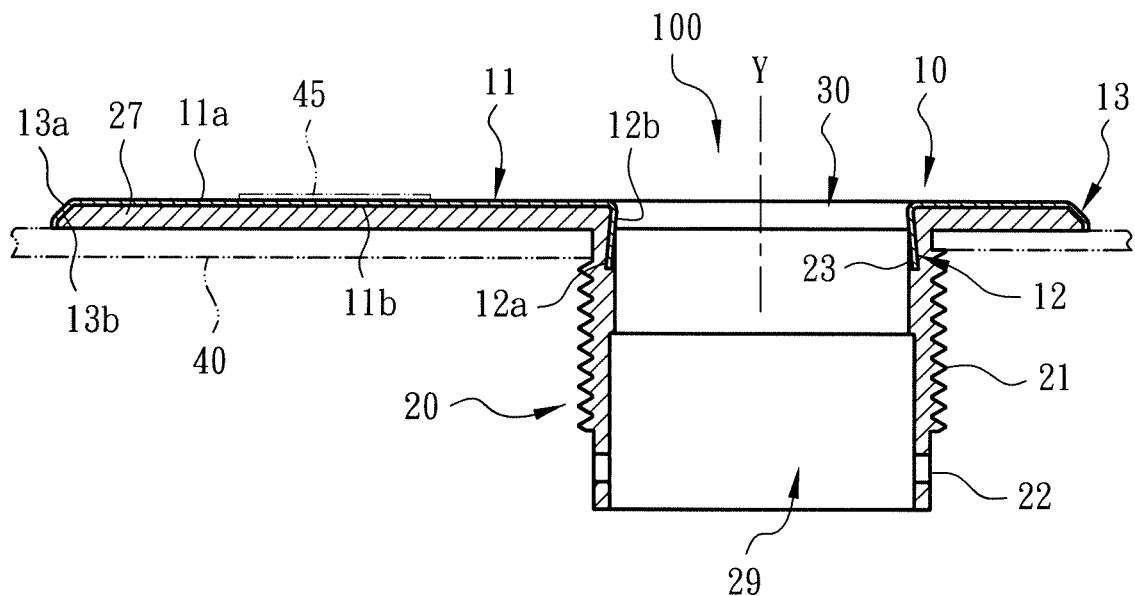
FIG. 4 is a plane sectional view of a modified embodiment of the present invention, showing that the second wall of the main body obliquely extends to outer side of the main body, whereby the first and second walls contain therebetween an acute angle.

FIG. 4 shows a modified embodiment of the present invention, in which the second wall 12 of the main body 100 or the metal head section extends to outer side of the main body 100 and is inclined from the eccentric axis y, whereby the first wall 11 and the second wall 12 contain an acute angle. In the structural form that the second wall 12 obliquely extends to outer side of the main body 100, a section 23 of the nonmetal belly section 20 cooperates with the nonmetal belly section 20 to respectively compress the inner surface 12b and outer surface 12a of the second wall 12 of the metal head section.

Accordingly, the nonmetal belly section 20 encloses at least a part of the second wall 12 to achieve secure connection effect.

Figure 5:
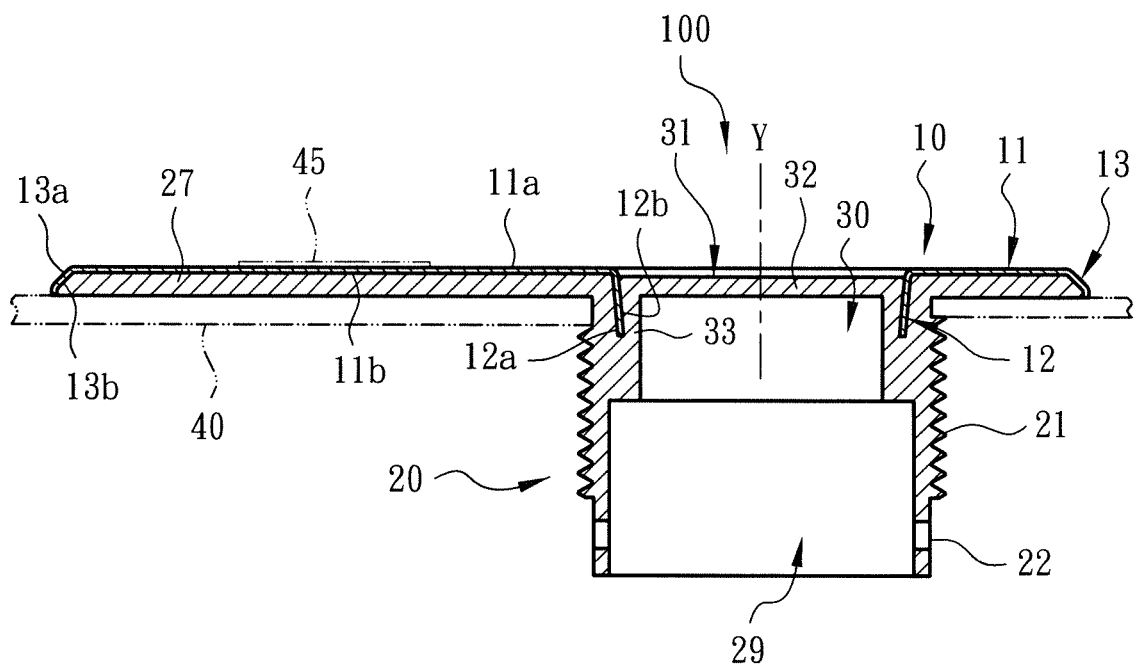
FIG. 5 is a plane sectional view of a preferred embodiment of the present invention, showing that the second wall of the main body obliquely extends to the interior of the main body, whereby the first and second walls contain therebetween an obtuse angle.

Please refer to FIG. 5, which shows that the second wall 12 of the main body 100 obliquely extends to the interior of the main body 100 (or the eccentric axis y), whereby the first wall 11 and the second wall 12 contain an obtuse angle and at least a part of the second wall 12 is enclosed between the nonmetal belly section 20 and the closure body 31.

Figure 6:
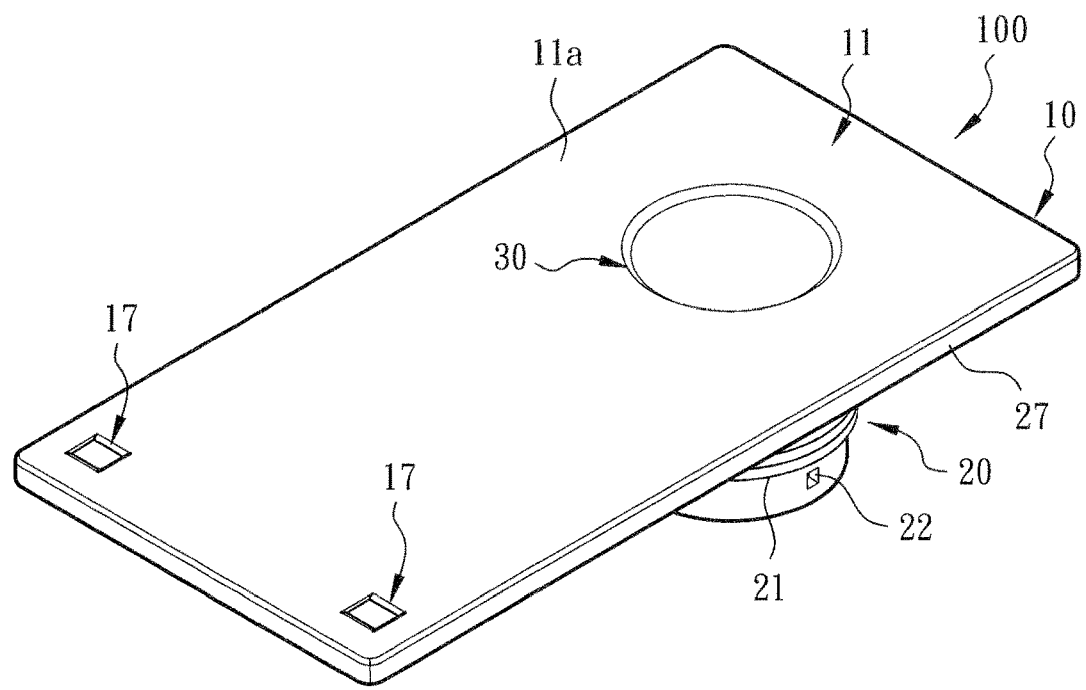
FIG. 6 is a perspective view of the present invention, showing that the first wall of the main body is formed with connection sections for assembling with the nonmetal belly section.
Figure 7:
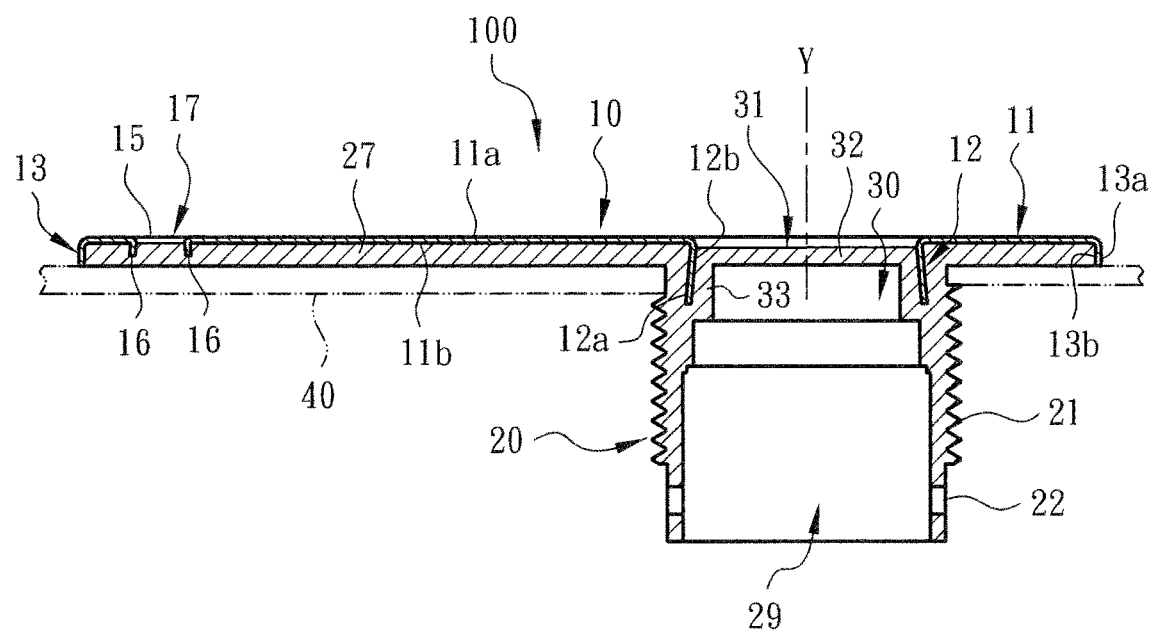
FIG. 7 is a plane sectional view according to FIG. 6, showing that the second wall of the main body obliquely extends to outer side of the main body, whereby the first and second walls contain therebetween an acute angle.

FIGS. 6 and 7 show that the second wall 12 of the main body obliquely extends to outer side of the main body 100 (or away from the eccentric axis y), whereby the first wall 11 and the second wall 12 contain an acute angle and at least a part of the second wall 12 is enclosed between the nonmetal belly section 20 and the closure body 31.

In a preferred embodiment, the first wall 11 of the main body 100 is formed with connection sections 17 (near the subsidiary wall 13) for connecting with the nonmetal belly section 20 and enhancing the connection effect between the metal head section 10 and the nonmetal belly section 20 without easy detachment. The connection sections 17 have a structural form made in such a manner that the first wall 11 is pressed to lower side of the drawing to form at least one hole structure 15 and two plate body sections 16 formed on two sides (or the periphery) of the hole structure 15.

Figure 8:
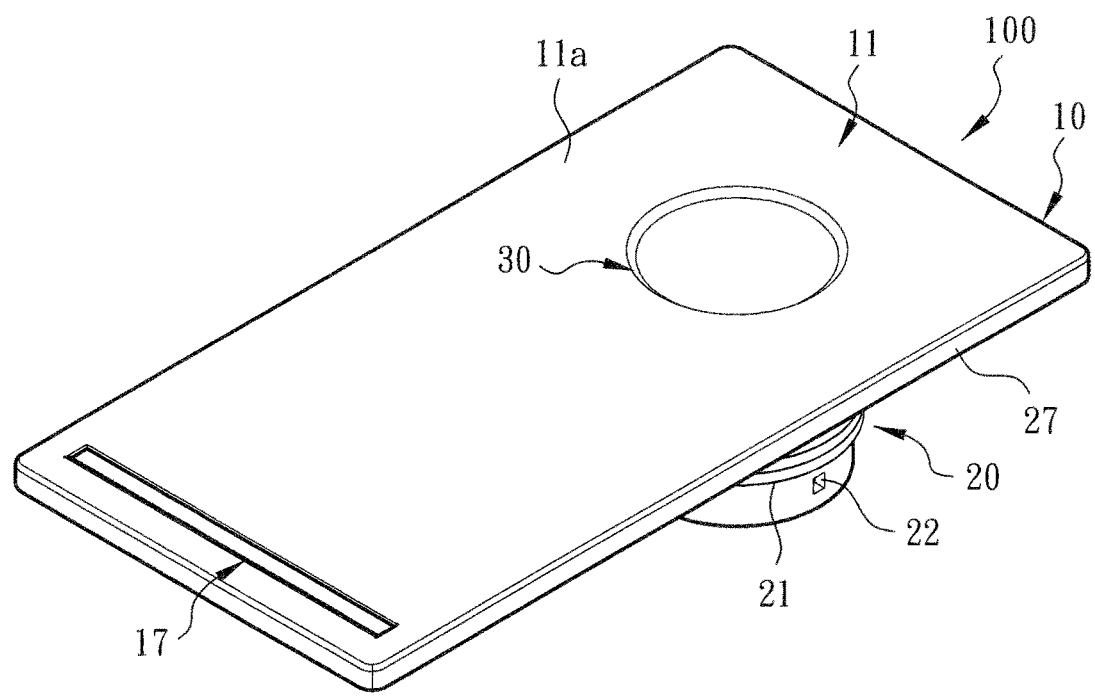
FIG. 8 is a perspective view of a modified embodiment of the present invention, showing that the first wall of the main body is formed with connection sections for assembling with the nonmetal belly section.
Figure 9:
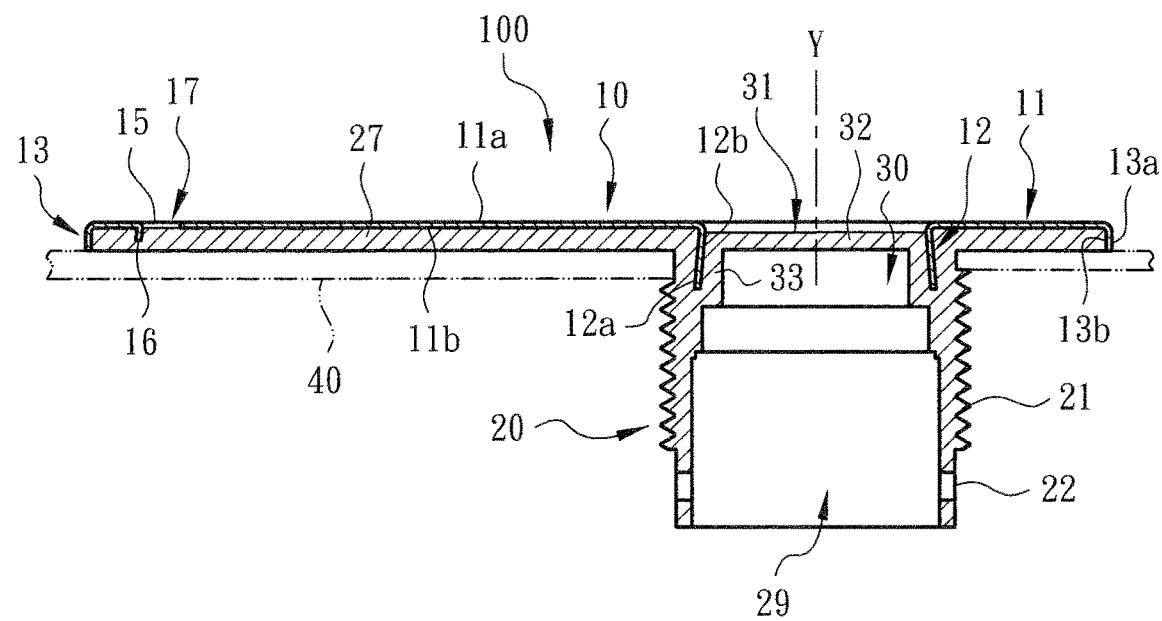
FIG. 9 is a sectional view according to FIG. 8, showing that the second wall of the main body obliquely extends to outer side of the main body, whereby the first and second walls contain therebetween an acute angle.

FIGS. 8 and 9 show that the second wall 12 of the main body obliquely extends to outer side of the main body 100 (or away from the eccentric axis y), whereby the first wall 11 and the second wall 12 contain an acute angle and at least a part of the second wall 12 is enclosed between the nonmetal belly section 20 and the closure body 31.

In this embodiment, the first wall 11 of the main body 100 is formed with a connection section 17. The connection section 17 have a structural form made in such a manner that the first wall 11 is pressed to lower side of the drawing to form at least one (elongated) hole structure 15 and a plate body section 16 formed on at least one side (or the periphery) of the hole structure 15. After the metal head section 10 and the nonmetal belly section 20 are connected, the structure of the plate body section 16 near the subsidiary wall 13 serves to enhance the connection security between the edge section of the metal head section 10 and the nonmetal belly section 20.

Figure 10:
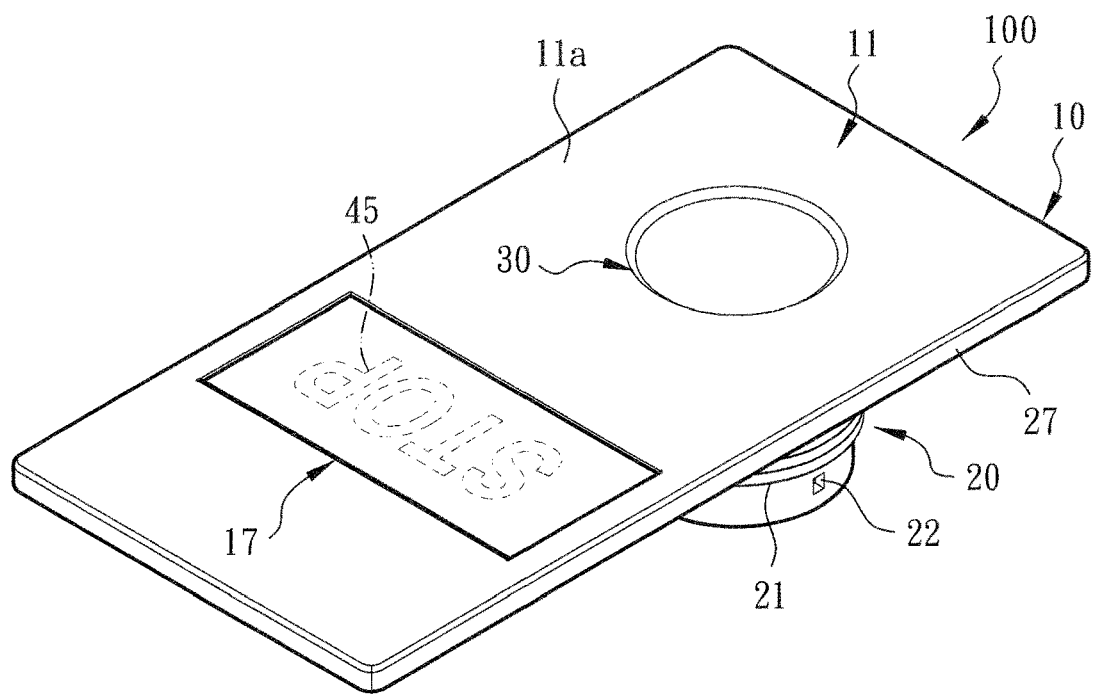
FIG. 10 is a perspective view of a preferred embodiment of the present invention, showing that the first wall of the main body is formed with connection sections for assembling with the nonmetal belly section and a figure (character) section is arranged on the first wall.
Figure 11:
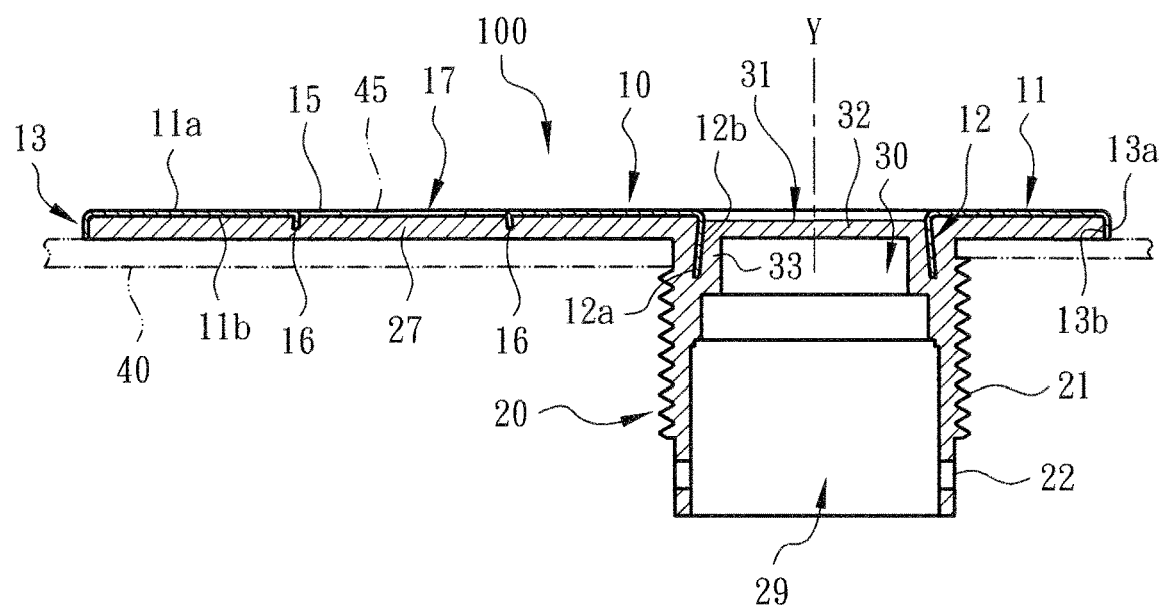
FIG. 11 is a sectional view according to FIG. 10, showing that the second wall of the main body obliquely extends to outer side of the main body, whereby the first and second walls contain therebetween an acute angle.

FIGS. 10 and 11 show that the second wall 12 of the main body obliquely extends to outer side of the main body 100 (or away from the eccentric axis y), whereby the first wall 11 and the second wall 12 contain an acute angle and at least a part of the second wall 12 is enclosed between the nonmetal belly section 20 and the closure body 31.

In this embodiment, the first wall 11 of the main body 100 is formed with a connection section 17. The connection section 17 have a structural form made in such a manner that the first wall 11 is pressed to lower side of the drawing to form a hole structure 15 and two plate body sections 16 formed on two sides (or the periphery) of the hole structure 15.

In this embodiment, a (solid) figure (character) section 45 can be disposed in the hole structure 15 to provide decoration or indication effect. Alternatively, the figure section 45 can be disposed on the tray section 27 of the nonmetal belly section 20 in a position corresponding to the hole structure 15, whereby the figure section 45 can be presented through the hole structure 15.

In a modified embodiment, the figure (character) section 45 can be pressed or formed with hollow form. Cooperatively, the nonmetal belly section 20 is made of transparent material, whereby the light emitted from the internal light source can pass through to achieve more apparent or special decoration and/or indication effect.

Figure 12:
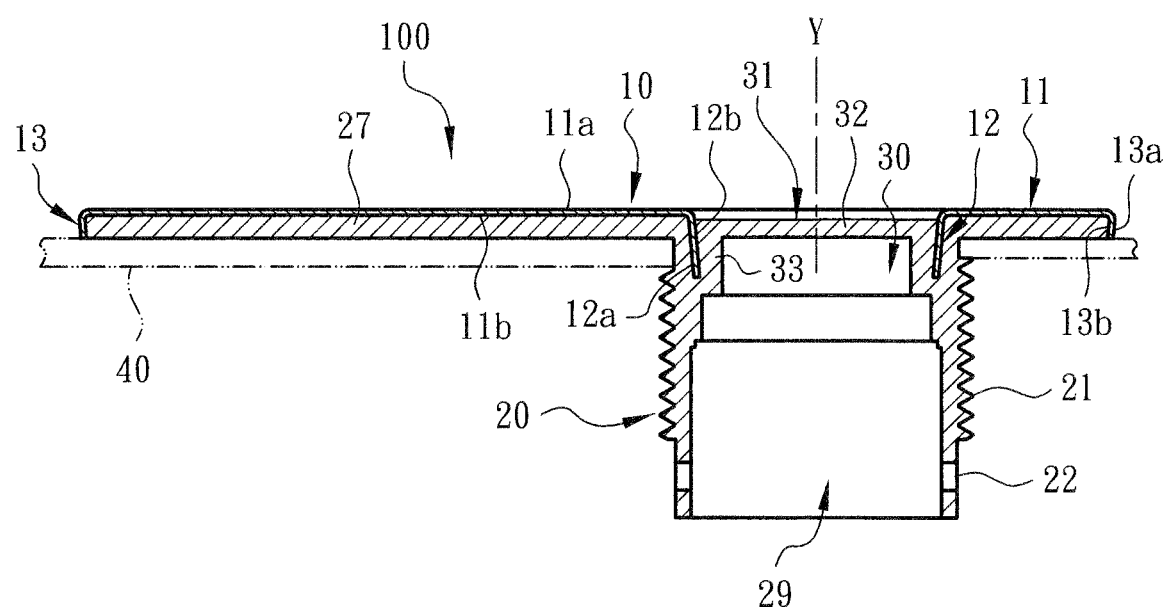
FIG. 12 is a plane sectional view of a modified embodiment of the present invention, showing that the second wall and the subsidiary wall of the main body obliquely extend to the interior of the main body.

Please refer to FIG. 12, which shows that the second wall 12 and the subsidiary wall 13 of the main body obliquely extend to the interior of the main body 100 (or to the eccentric axis y), whereby the first wall 11 and the second wall 12 contain an obtuse angle and at least a part of the second wall 12 is enclosed between the nonmetal belly section 20 and the closure body 31.

In this embodiment, the subsidiary wall 13 obliquely extends to the interior of the main body 100 (or to the eccentric axis y), whereby the first wall 11 and the subsidiary wall 13 and the nonmetal belly section 20 are more securely connected so that (the edge section) is uneasy to detach.

Figure 13:
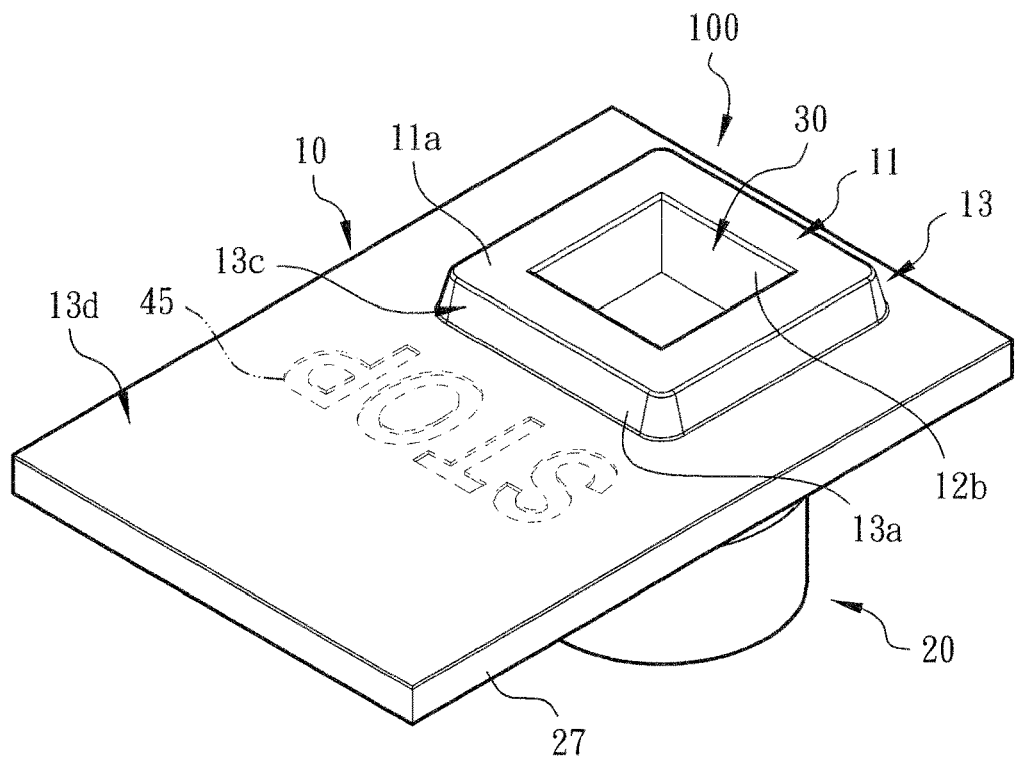
FIG. 13 is a perspective view of a preferred embodiment of the present invention, showing that the main body is formed with high-and-low stage structure and a figure (character) section is arranged on the first wall.
Figure 14:
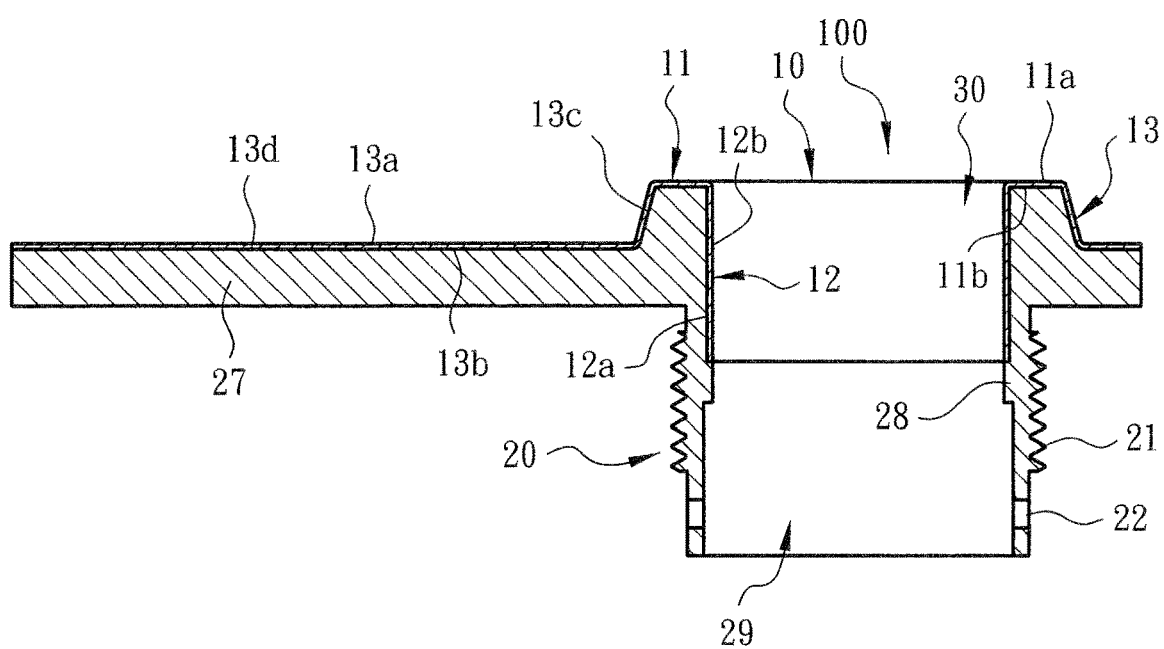
FIG. 14 is a sectional view according to FIG. 13, showing that the first wall of the main body extends in a direction normal to the eccentric axis and the other end of the first wall extends to outer side of the main body to form the subsidiary wall inclined from the eccentric axis and the tail end of the subsidiary wall extends to outer side of the main body in a direction normal to the eccentric axis to form the connection section.

FIGS. 13 and 14 show that the first wall 11 of the metal head section or the main body 100 extends in a direction normal to the eccentric axis y. The other end of the first wall 11 extends to outer side of the main body 100 to form the subsidiary wall 13 inclined from the eccentric axis y, whereby the subsidiary wall 13 has an (inclined) head section 13c. The tail end of the subsidiary wall 13 (or the head section 13c) extends to outer side of the main body 100 in a direction normal to the eccentric axis y to form a connection section 13d. Accordingly, the metal head section 10 (or the first wall 11 and the subsidiary wall 13) and the tray section 27 of the nonmetal belly section 20 are respectively formed with at least two-stage structure or high-and-low stage structure. This can avoid mis-touch of the switch and increase the structural strength of the main body 100.

In this embodiment, the angle contained between the first wall 11 and the head section 13c of the subsidiary wall is an acute angle, a right angle or an obtuse angle. The angle contained between the head section 13c of the subsidiary wall and the connection section 13d is an acute angle, aright angle or an obtuse angle. In addition, the figure section 45 is arranged on the first wall 11.

Figure 15:
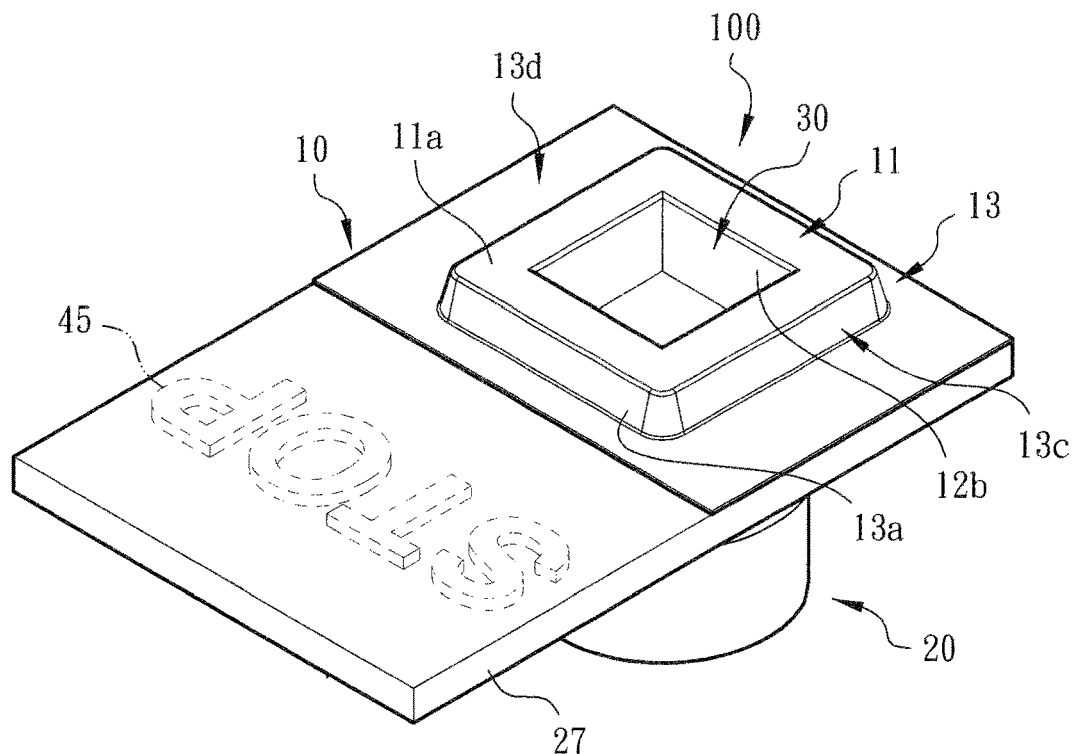
FIG. 15 is a perspective view of a modified embodiment of the present invention, showing that a figure (character) section is arranged on the nonmetal belly section of the main body.
Figure 16:
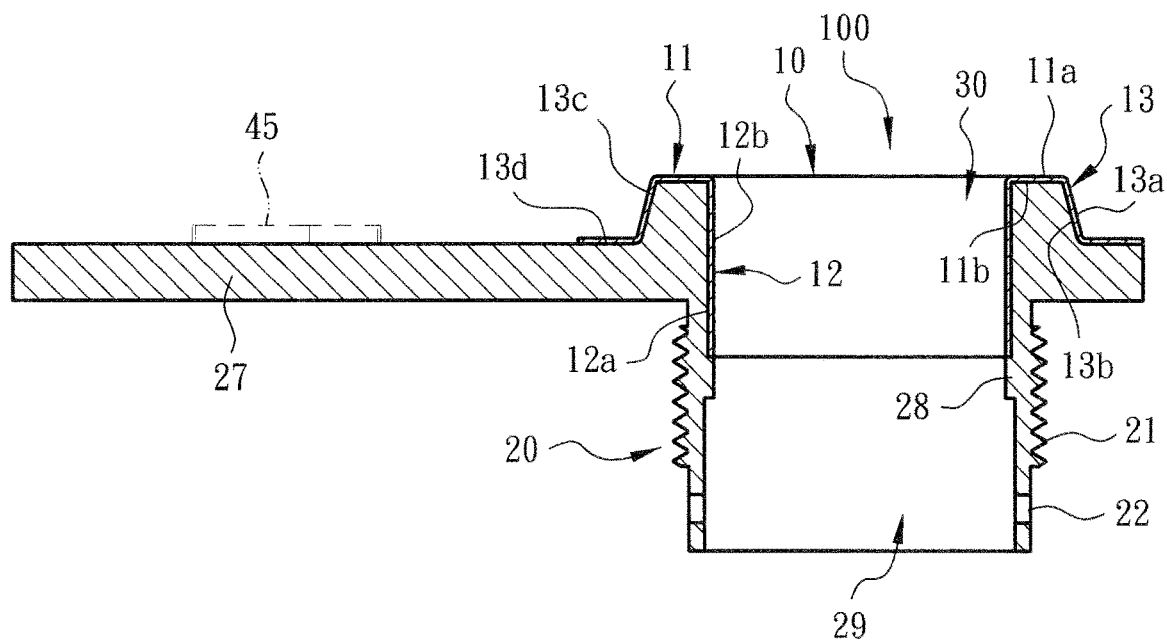
FIG. 16 is a sectional view according to FIG. 15, showing that the first wall of the main body extends in a direction normal to the eccentric axis and the other end of the first wall extends to outer side of the main body to form the subsidiary wall inclined from the eccentric axis and the tail end of the subsidiary wall extends to outer side of the main body in a direction normal to the eccentric axis to form the connection section.

Please refer to FIGS. 15 and 16, which show that the first wall 11 of the metal head section or the main body 100 extends in a direction normal to the eccentric axis y. The other end of the first wall 11 extends to outer side of the main body 100 to form the subsidiary wall 13 inclined from the eccentric axis y, whereby the subsidiary wall 13 has an (inclined) head section 13c. The tail end of the subsidiary wall 13 (or the head section 13c) extends to outer side of the main body 100 in a direction normal to the eccentric axis y to form a connection section 13d. Accordingly, the metal head section 10 (or the first wall 11 and the subsidiary wall 13) and the tray section 27 of the nonmetal belly section 20 are respectively formed with at least two-stage structure or high-and-low stage structure.

In this embodiment, the angle contained between the first wall 11 and the head section 13c of the subsidiary wall is an acute angle, a right angle or an obtuse angle. The angle contained between the head section 13c of the subsidiary wall and the connection section 13d is an acute angle, aright angle or an obtuse angle. In addition, the tray section 27 of the nonmetal belly section 20 at least partially extends to outer side of the main body 100 and protrudes from the connection section 13d. The portion of the tray section 27 protruding from the connection section 13d is defined as a protrusion portion. A (solid) figure section 45 can be arranged on the protrusion portion.

Figure 17:
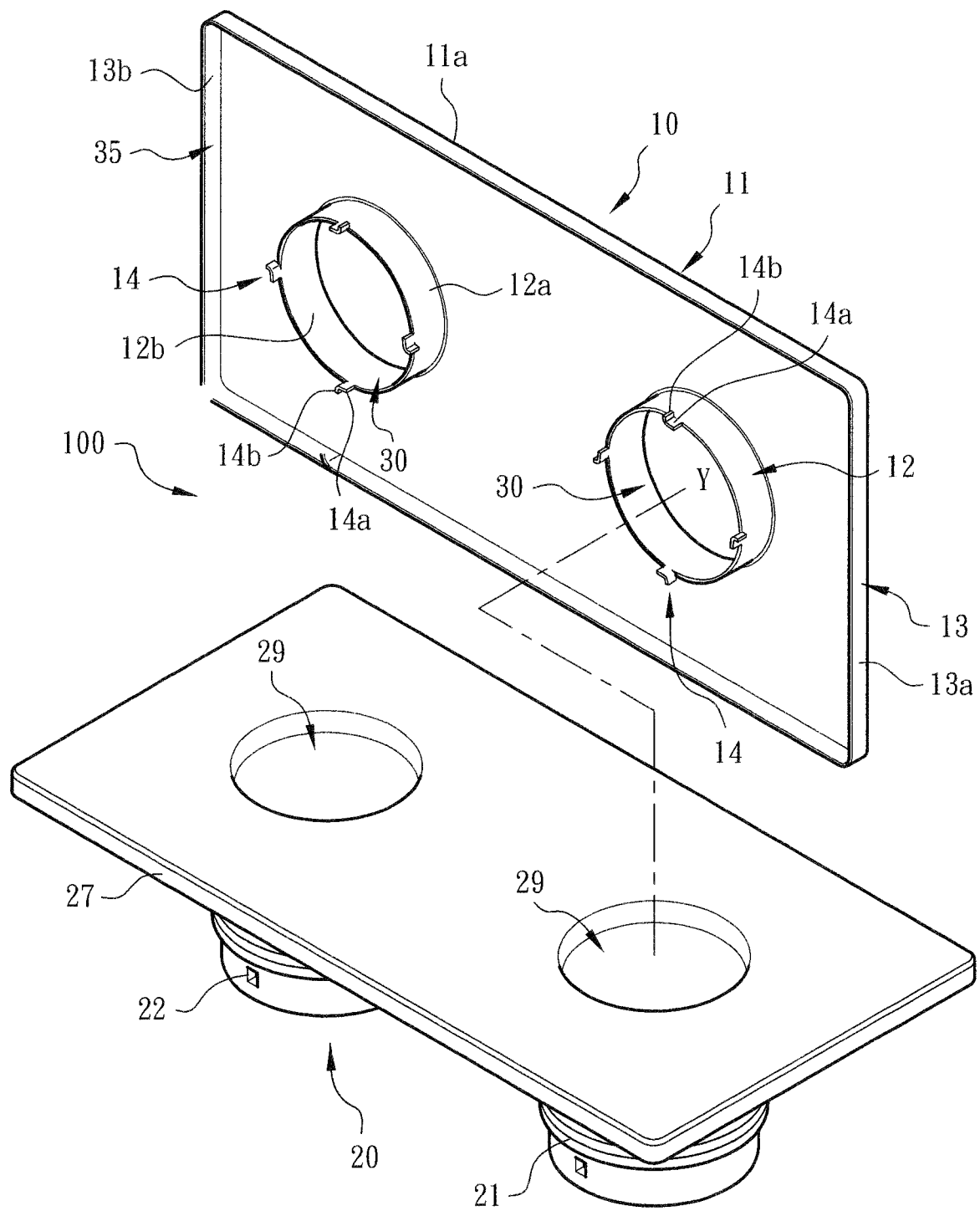
FIG. 17 is a perspective exploded view of a preferred embodiment of the present invention, showing that the second wall of the metal head section of the main body is formed with assembling sections.
Figure 18:
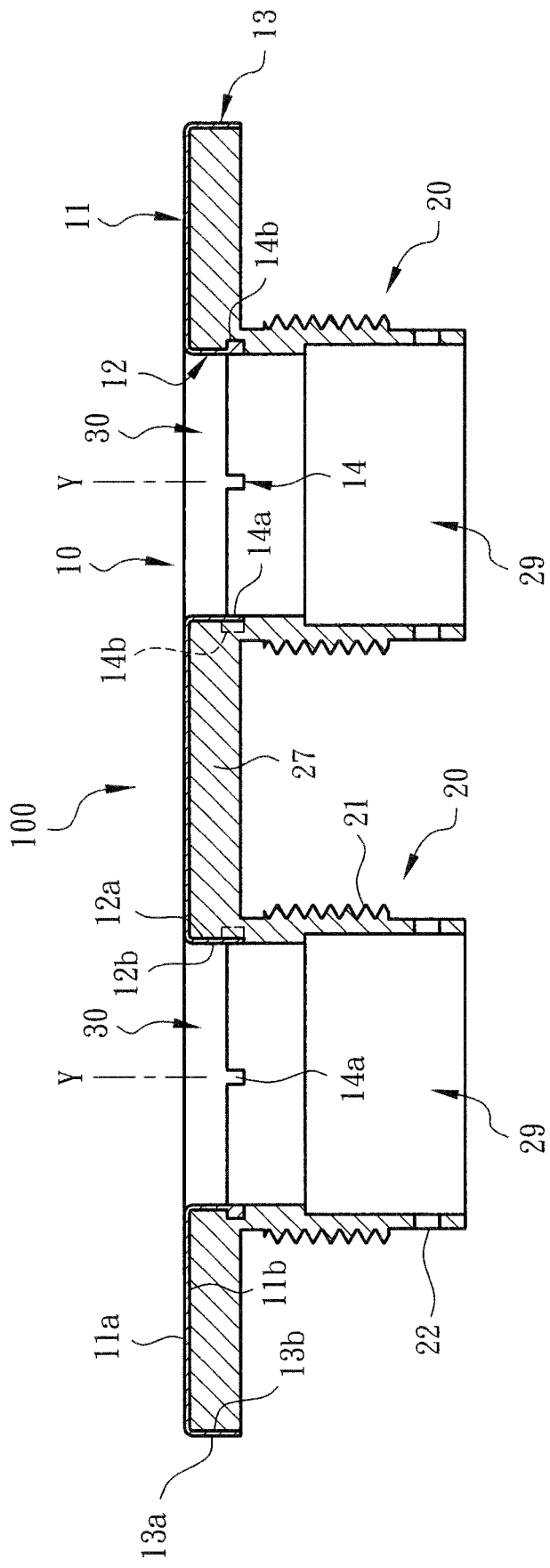
FIG. 18 is a plane sectional view according to FIG. 17, showing that the nonmetal belly section is connected with the metal head section and the assembling sections.

Please refer to FIGS. 17 and 18, which show that the metal head section 10 of the main body 100 is formed with two shaft holes 30. The nonmetal belly section 20 is formed with two internal spaces 29 corresponding to the two shaft holes 30. In addition, the second wall 12 of the metal head section 10 is formed with at least one assembling section 14.

In this embodiment, multiple assembling sections 14 integrally protrude from the lower section of the second wall 12 in a direction in parallel to the eccentric axis y. Each assembling section 14 includes a base section 14a coplanar with the second wall 12 (or the outer surface 12a of the second wall) and a subsidiary section 14b perpendicularly bent from the base section 14a to protrude in a direction to outer side of the main body 100 (or away from the eccentric axis y), whereby the assembling section 14 has the form of an L-shaped plate body structure.

FIGS. 17 and 18 show that the assembling section 14 has the form of an L-shaped plate body structure. When the nonmetal belly section 20 is connected with the metal head section 10, the structures of the assembling sections 14 serve to prevent the metal head section 10 from easily detaching from the nonmetal belly section 20 so as to achieve a secure connection effect.

Figure 19:
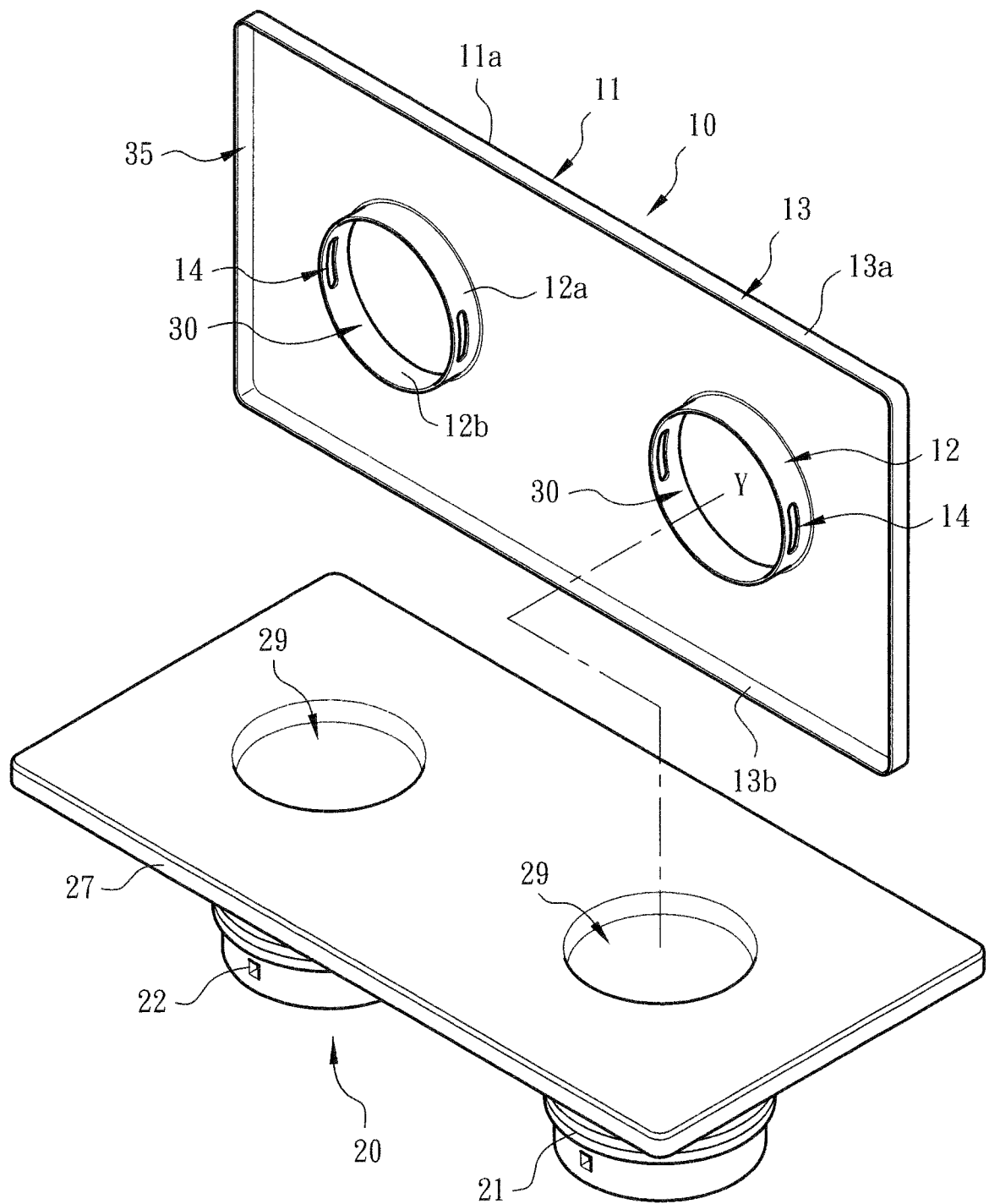
FIG. 19 is a perspective exploded view of a modified embodiment of the present invention, showing that the second wall of the metal head section of the main body is formed with assembling sections for connecting with the nonmetal belly section.
Figure 20:
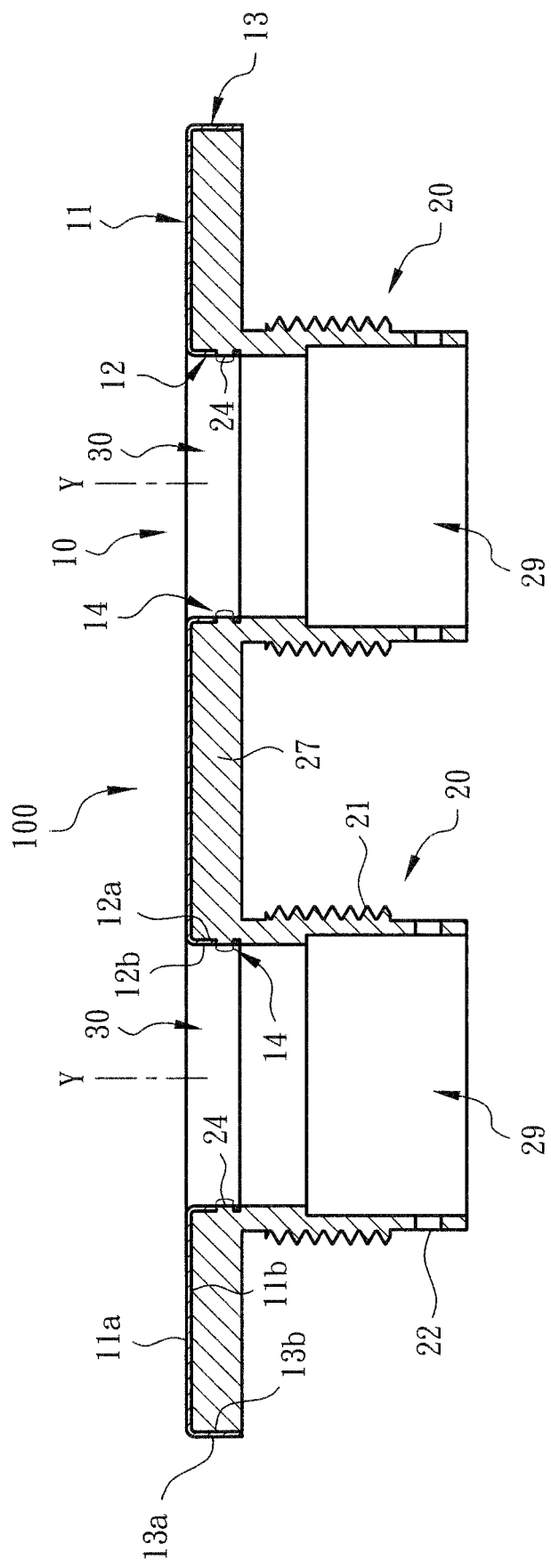
FIG. 20 is a plane sectional view according to FIG. 19, showing that the nonmetal belly section is formed with insertion sections plugged into the assembling sections of the metal head section.

Please refer to FIGS. 19 and 20, which show that the metal head section 10 of the main body 100 is formed with two shaft holes 30. The nonmetal belly section 20 is formed with two internal spaces 29 corresponding to the two shaft holes 30. In addition, the second wall 12 of the metal head section 10 is formed with at least one assembling section 14.

In this embodiment, the assembling sections 14 have the form of hole structures (or protrusion structures). The nonmetal belly section 20 is formed with insertion sections 24 protruding to the eccentric axis y (or the interior of the main body 100) (or formed with insertion sections 24 recessed to outer side of the main body 100). When the nonmetal belly section 20 is assembled with the metal head section 10, the nonmetal belly section 20 is plugged into the assembling sections 14 of the metal head section 10 and the insertion sections 24 are inserted with the assembling sections 14. In this case, the metal head section 10 is uneasy to detach from the nonmetal belly section 20 and a secure connection effect is achieved.

Figure 21:
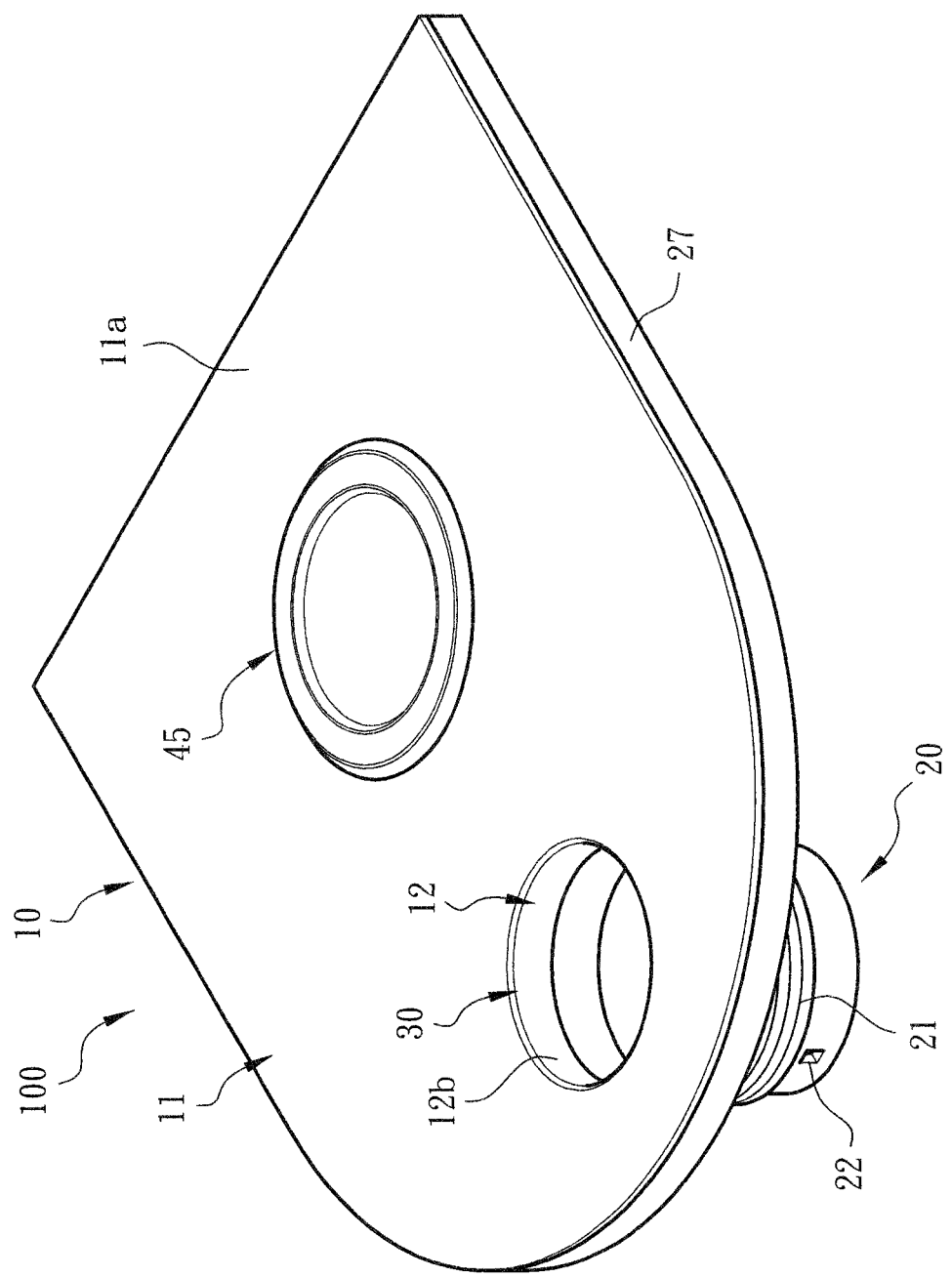
FIG. 21 is a perspective view of a preferred embodiment of the present invention, showing that a solid figure (character) section is stamped on the first wall of the main body.
Figure 22:
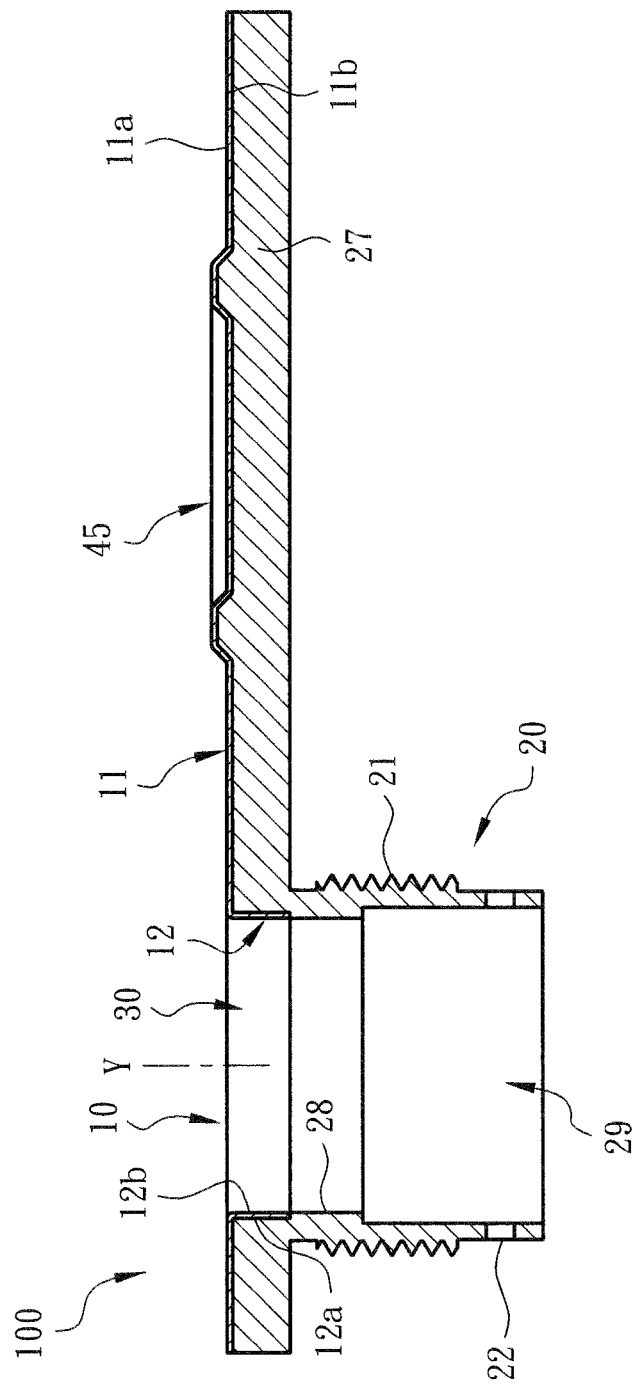
FIG. 22 is a sectional view according to FIG. 21.

Please refer to FIGS. 21 and 22, which show that the (solid) figure section 45 is arranged or pressed and formed on the main body 100 or the first wall 11.

Figure 23:
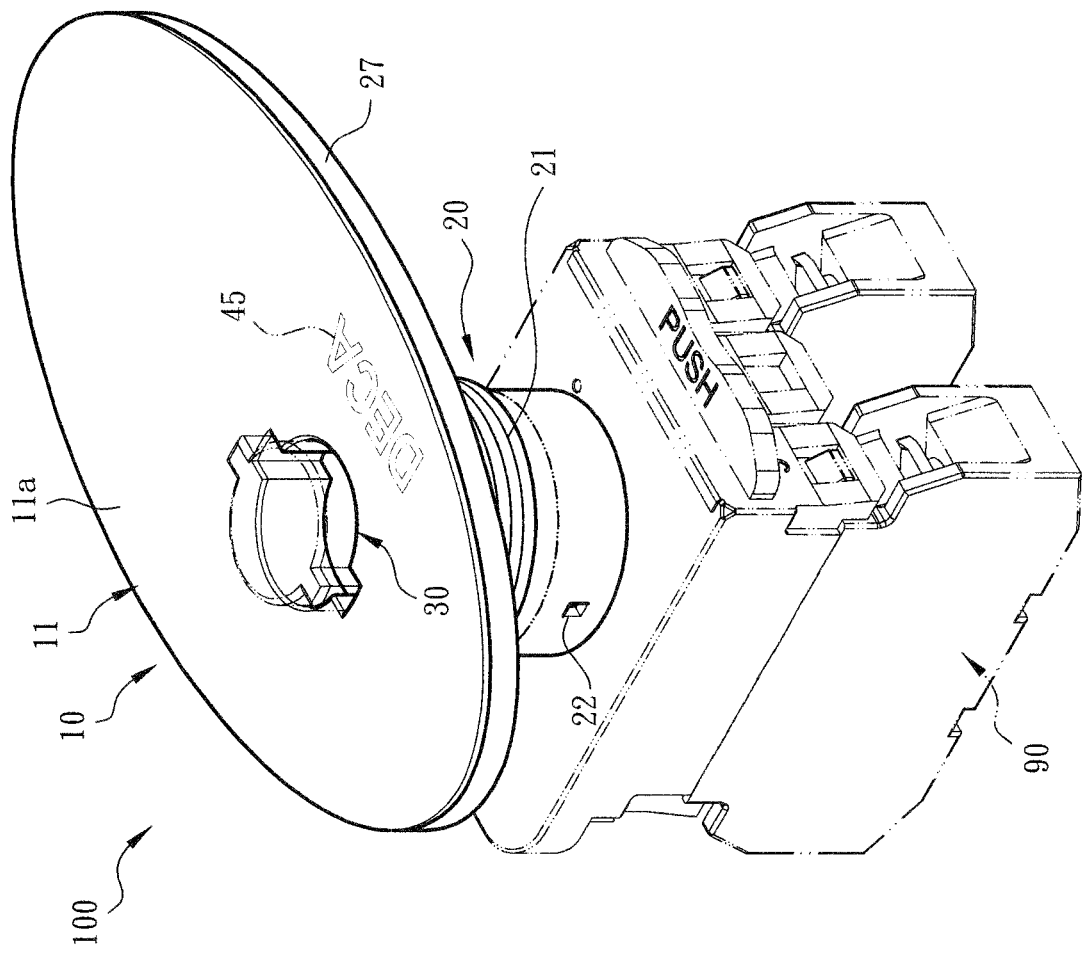
FIG. 23 is a perspective view of a modified embodiment of the present invention, showing the structures of the metal head section and the nonmetal belly section of the main body, in which the phantom lines show that the main body is assembled with the switch component (or wire connection terminal)
Figure 24:
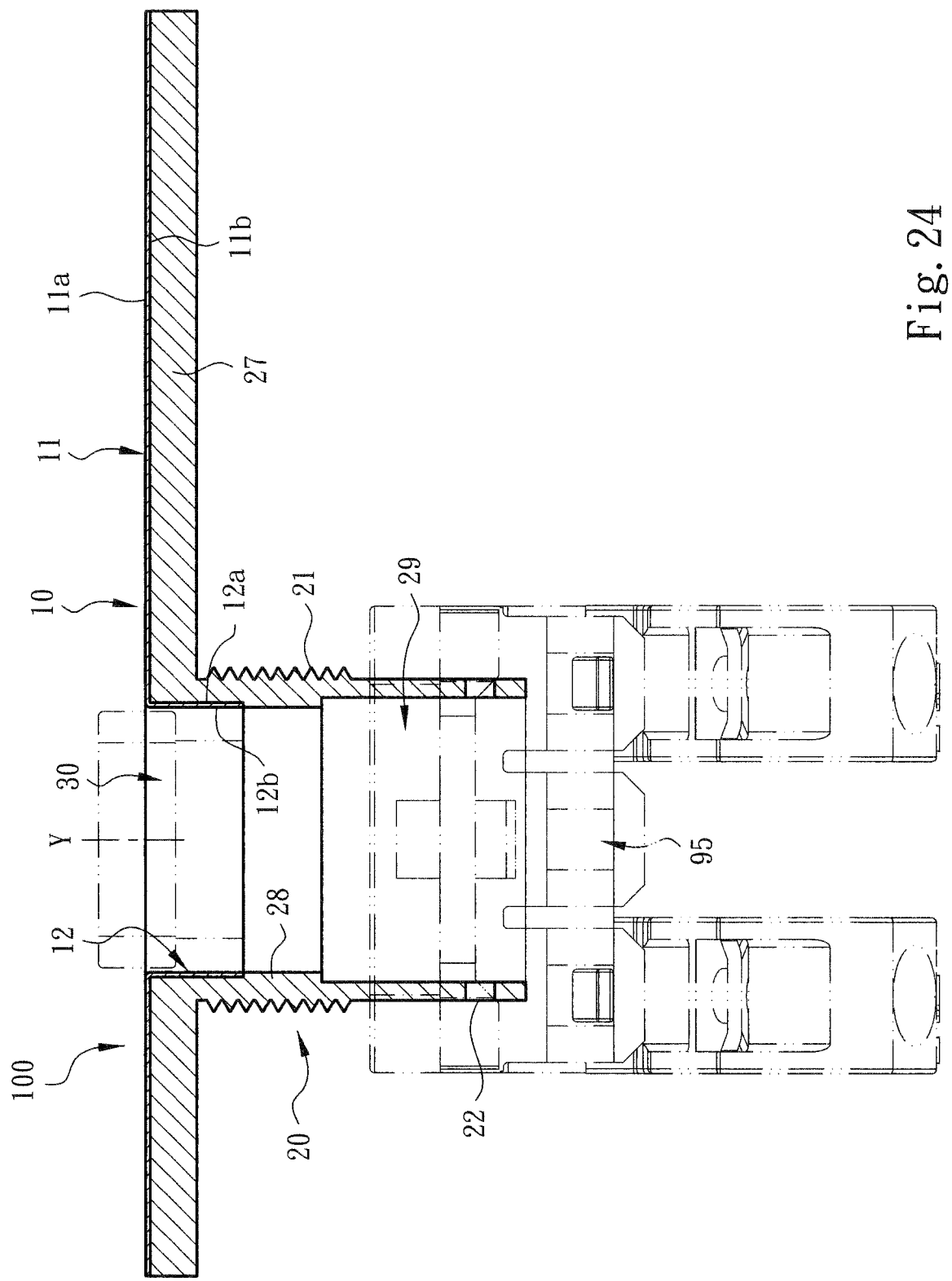
FIG. 24 is a sectional view according to FIG. 23.

It should be noted that the shaft hole 30 of the metal head section 10 made of thin sheet body can be directly pressed into geometrical configuration. For example, FIGS. 23 and 24 show that two (rectangular) holes are connected with two sides of the (circular) shaft hole 30. Therefore, the shaft hole 30 (and/or the first wall 11) also can be made with square, rectangular, triangular, polygonal, regular or irregular geometrical configuration.

The phantom lines of FIGS. 23 and 24 show that the main body 100 is assembled with the switch component 90 (or wire connection terminal). In this embodiment, the figure section 45 is arranged, printed or stamped on the first wall 11 of the metal head section 10 in accordance with the practical use requirement.

Figure 25:
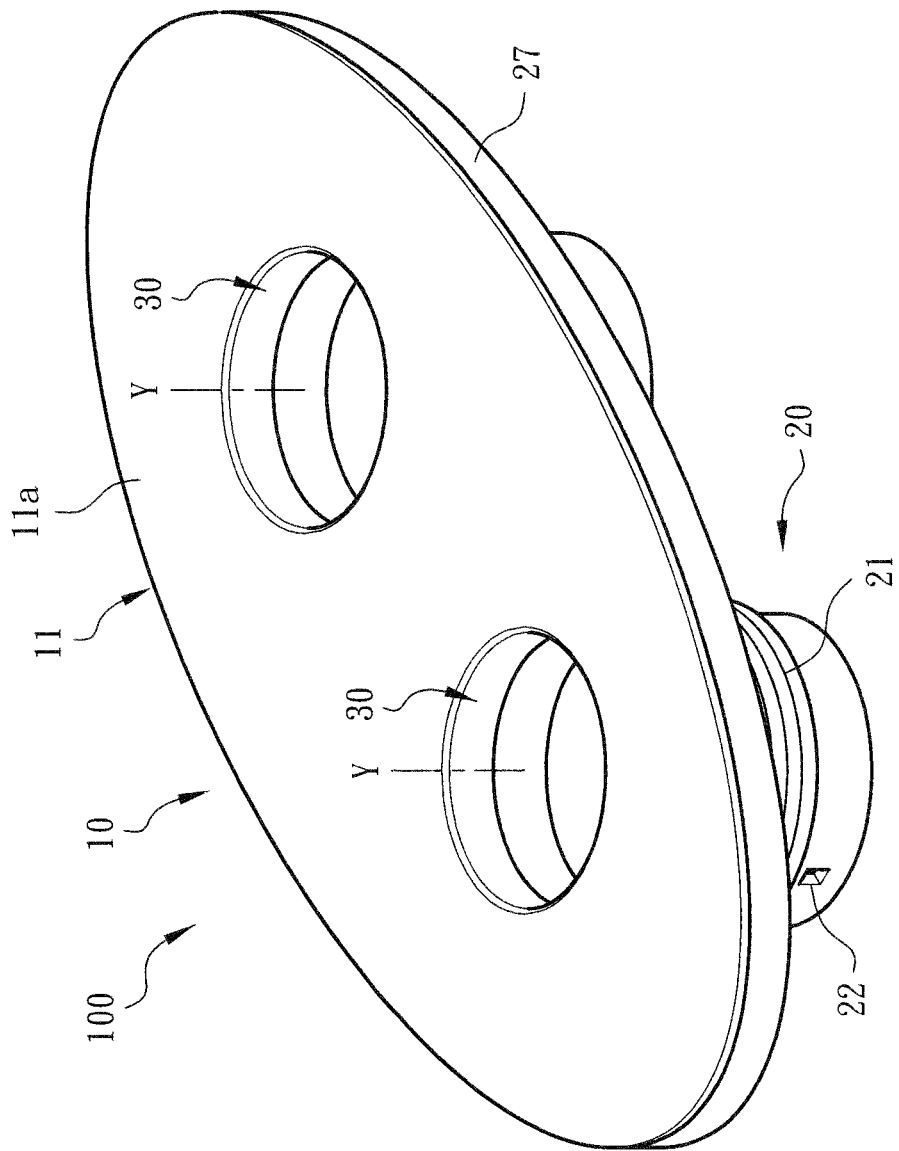
FIG. 25 is a perspective view of an embodiment of the present invention.
Figure 26:
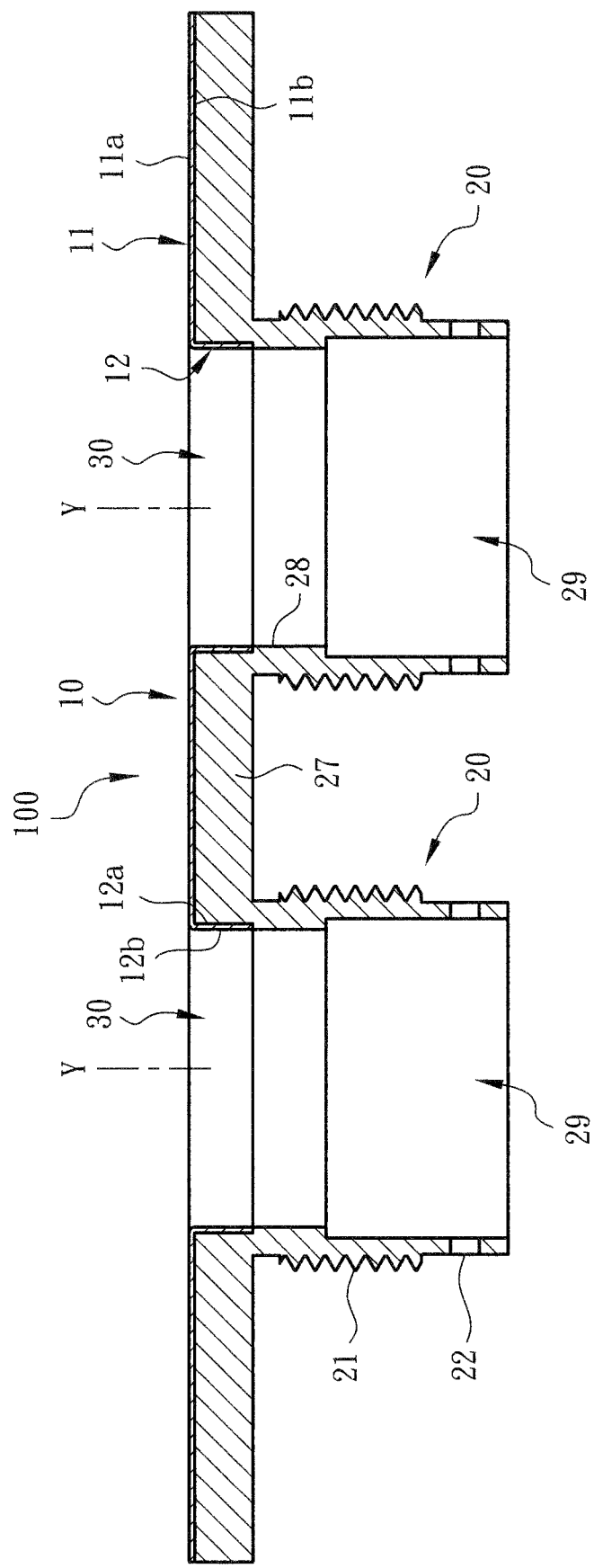
FIG. 26 is a sectional view according to FIG. 25, showing that the metal head section and the nonmetal belly section of the main body are assembled with each other.
Figure 27:
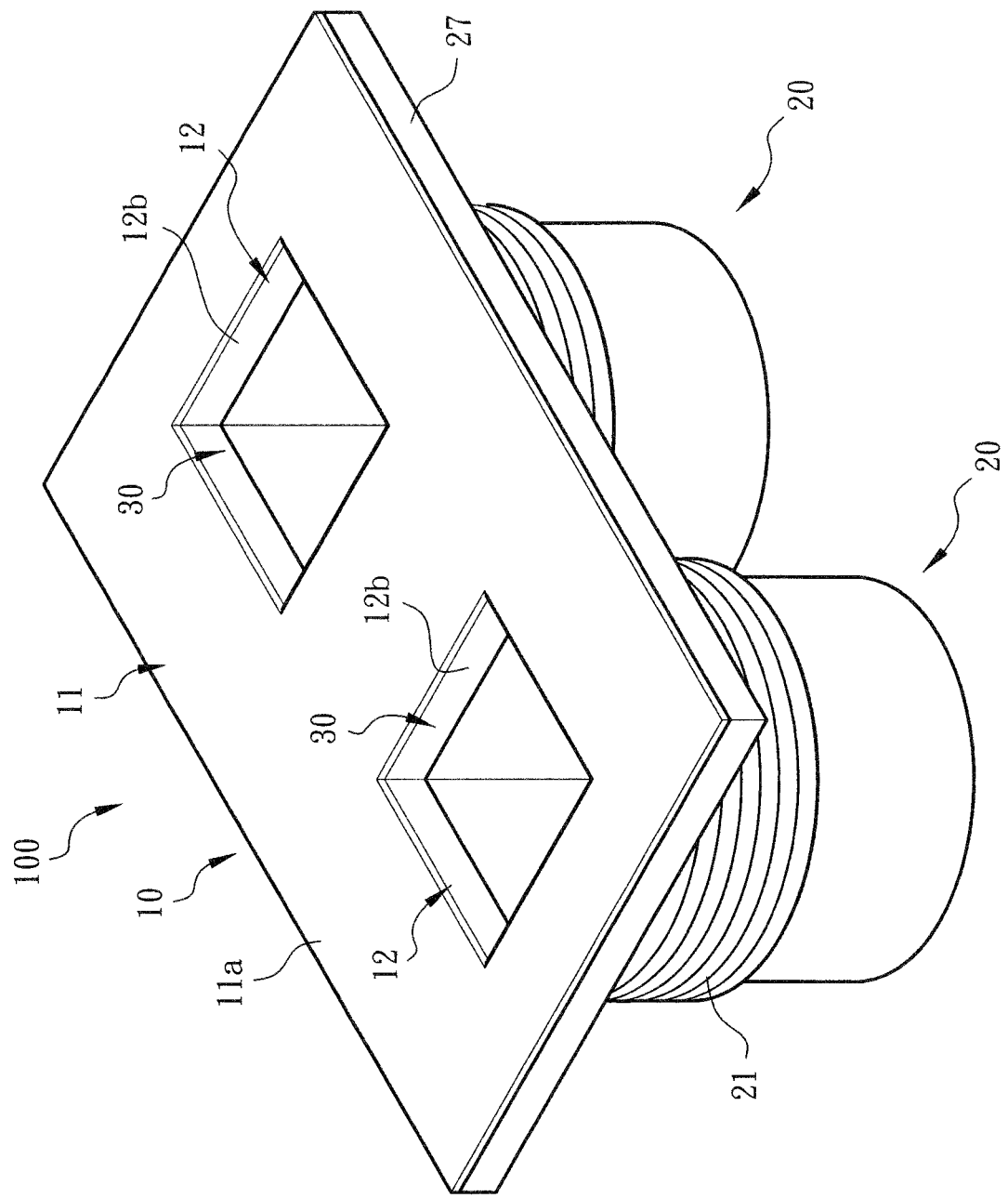
FIG. 27 is a perspective view of a modified embodiment of the present invent ion.
Figure 28:
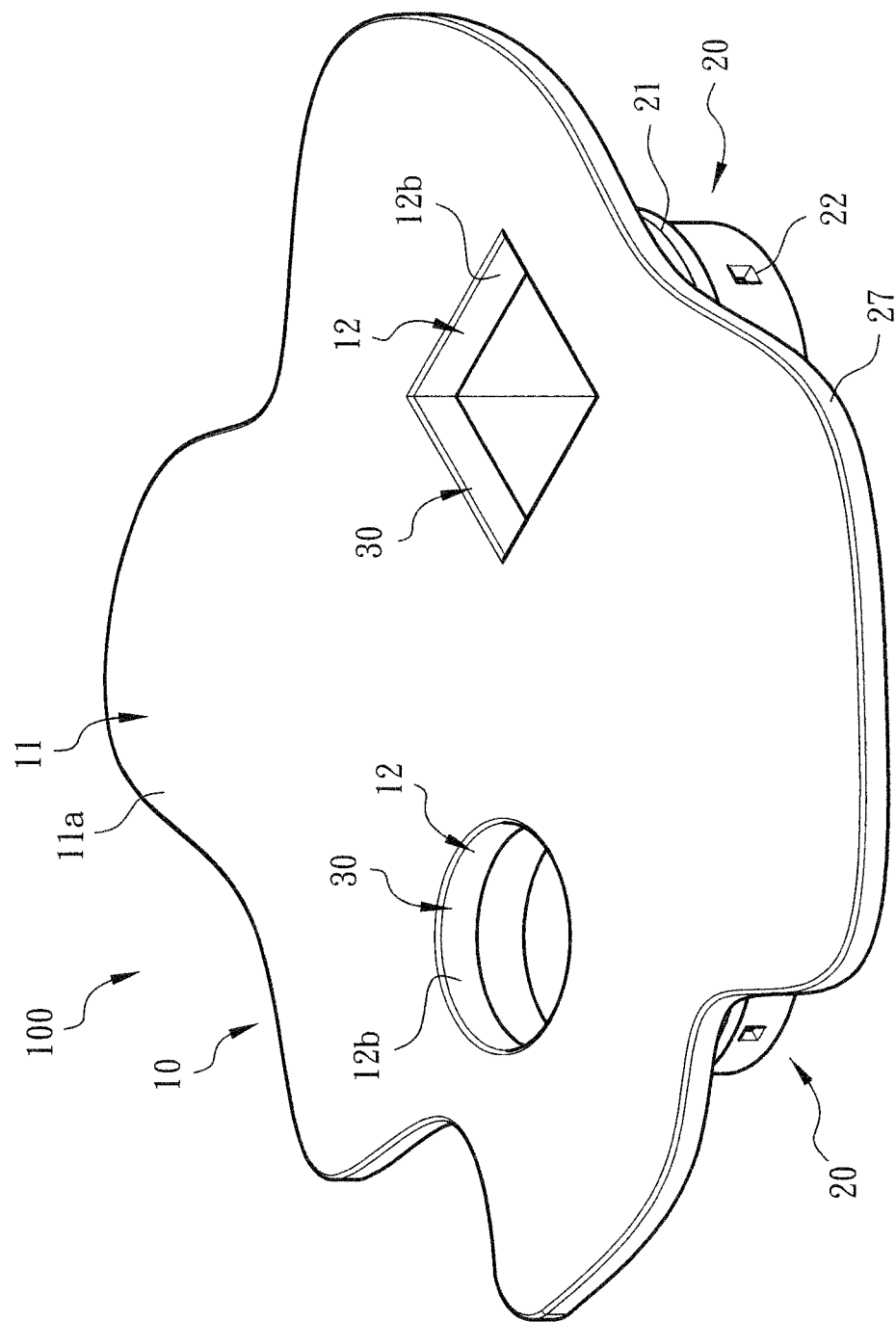
FIG. 28 is a perspective view of a preferred embodiment of the present invention, showing the first wall of the main body is formed with an (irregular) geometrical configuration.

FIGS. 25 and 26 show that the metal head section 10 (or the first wall 11) has an elliptic configuration and two circular shaft holes 30. FIG. 27 shows that the metal head section 10 (or the first wall 11) has a rectangular configuration and two square shaft holes 30. FIG. 28 shows that the metal head section 10 (or the first wall 11) has an (irregular) geometrical configuration and a circular shaft hole 30 and a square shaft hole 30.

Figure 29:
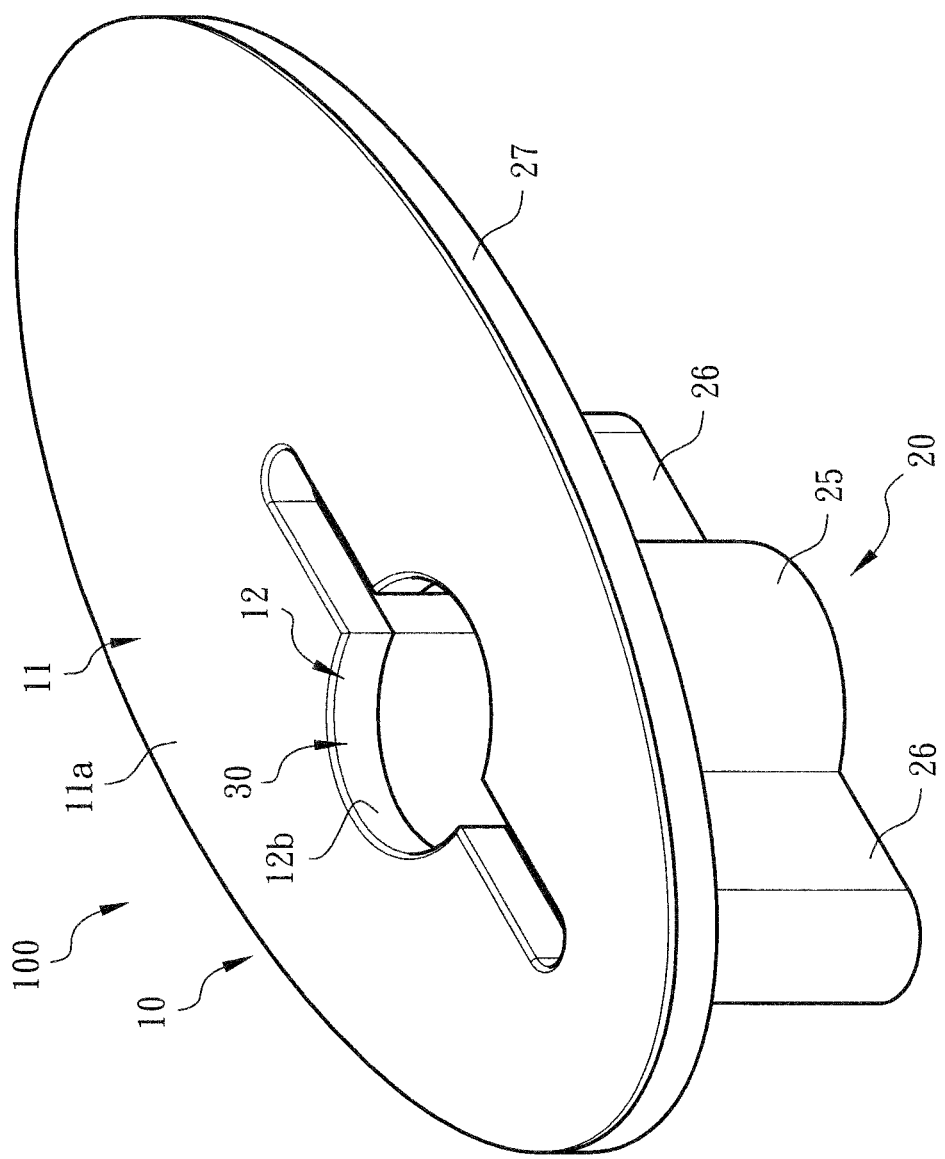
FIG. 29 is a perspective view of a preferred embodiment of the present invention, showing that the metal head section and the nonmetal belly section of the main body are assembled with each other.
Figure 30:
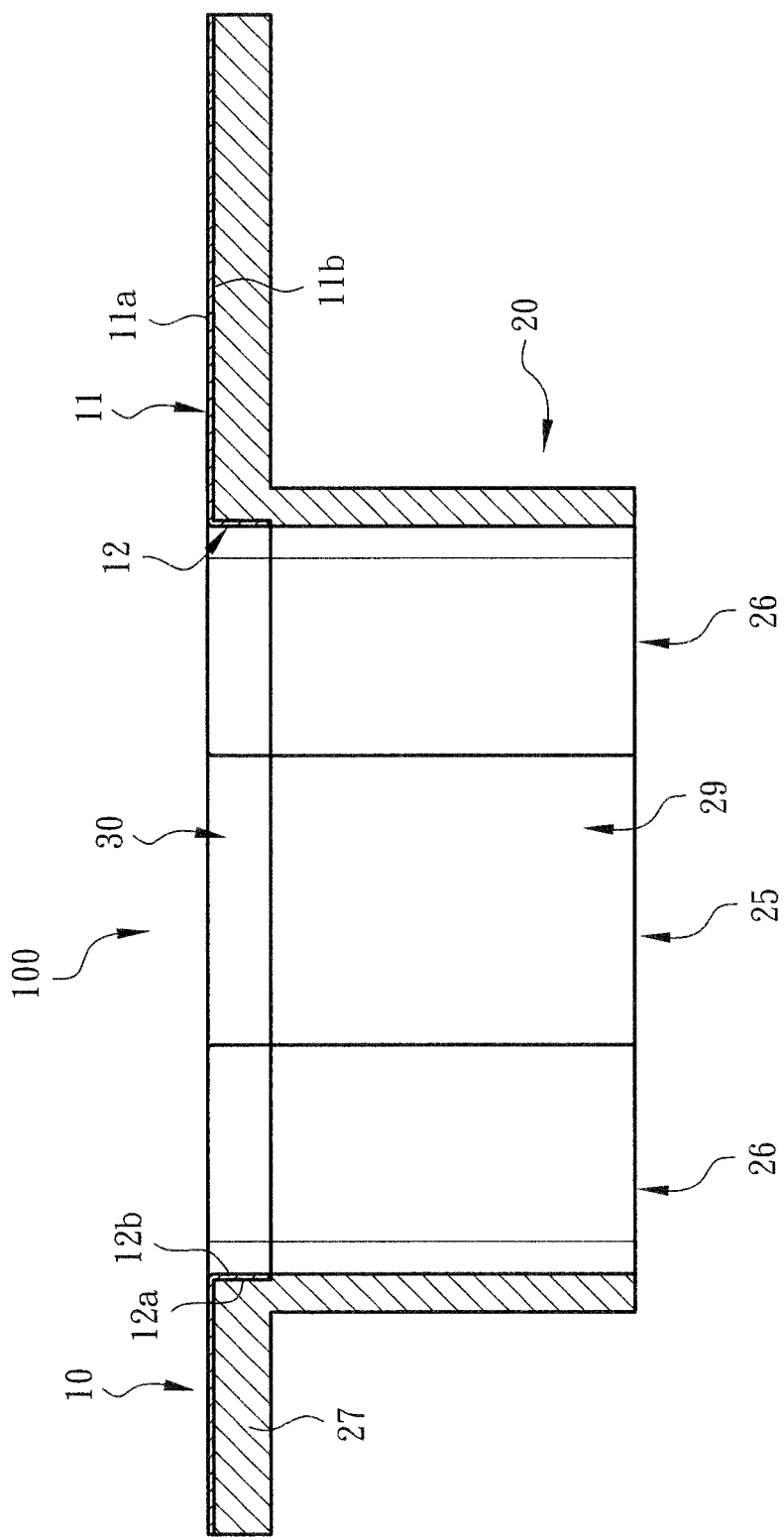
FIG. 30 is a sectional view according to FIG. 29, showing that the metal head section and the nonmetal belly section of the main body are assembled with each other.

FIGS. 29 and 30 show a preferred embodiment of the present invention. In this embodiment, two (elongated) holes are respectively connected with two sides of the (circular) shaft hole 30 of the metal head section 10. In addition, according to the practical use requirement (and corresponding to the structure of the shaft hole 30 and for assembling with different forms of switch component), the nonmetal belly section 20 has a (circular or arched) main section 25 and two (elongated) wing sections 26 integrally connected with two sides of the main section 25.

Figure 31:
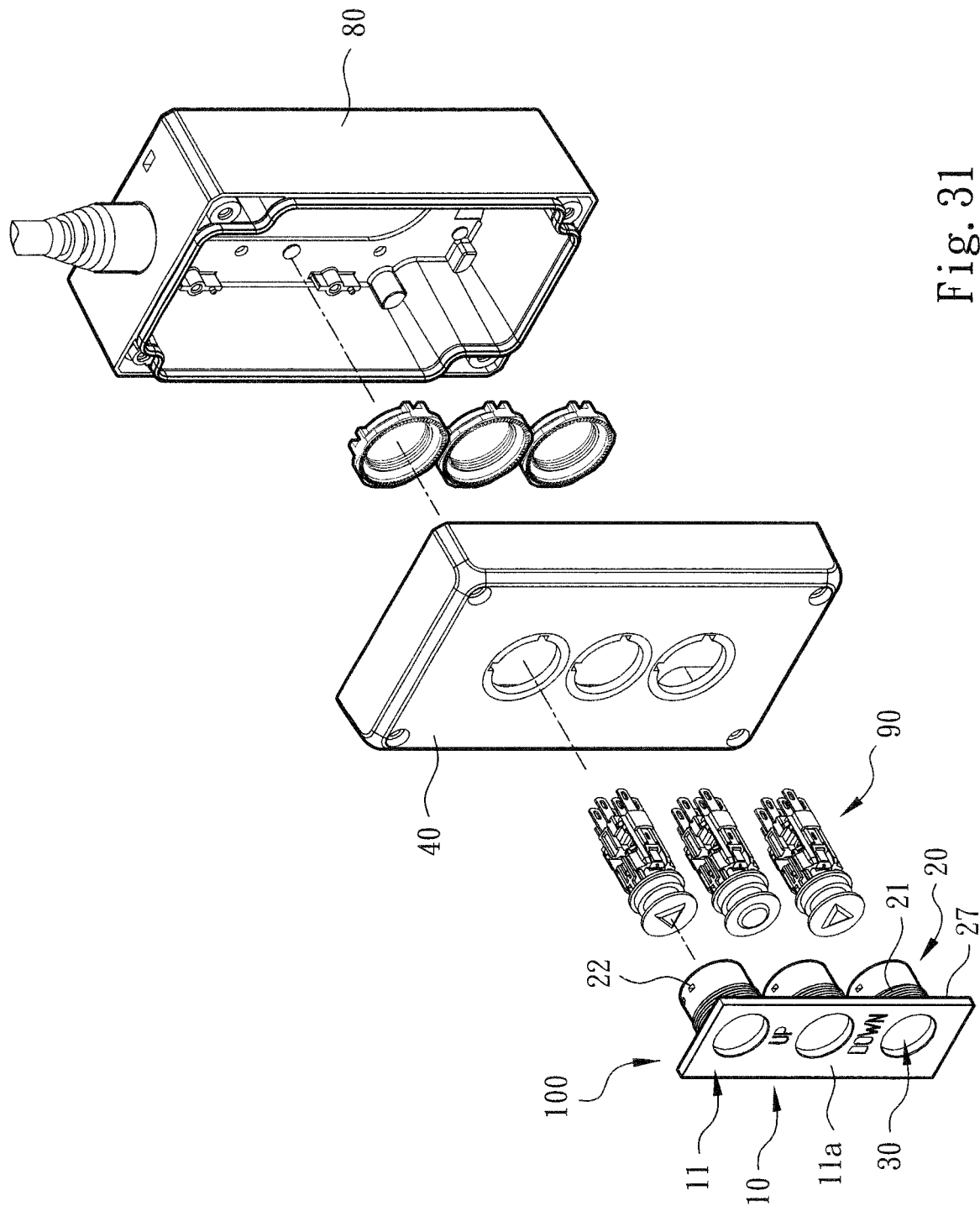
FIG. 31 is a perspective exploded view of an embodiment of the present invention, showing the structures of the main body, the switch component, the substrate and the case.

FIG. 31 shows the structures of the main body 100, the switch component 90, the substrate 40 and the case 80. The metal head section 10 of the main body 100 has multiple shaft holes 30. At least one (or multiple) nonmetal belly sections 20 are connected with the metal head section 10 corresponding to the shaft holes 30. Multiple switch components 90 are mounted in the nonmetal belly sections 20 and disposed on the substrate 40. The substrate 40 cooperates with the case 80 to receive (or secure) the nonmetal belly sections 20 and the switch components 90.

Figure 32:
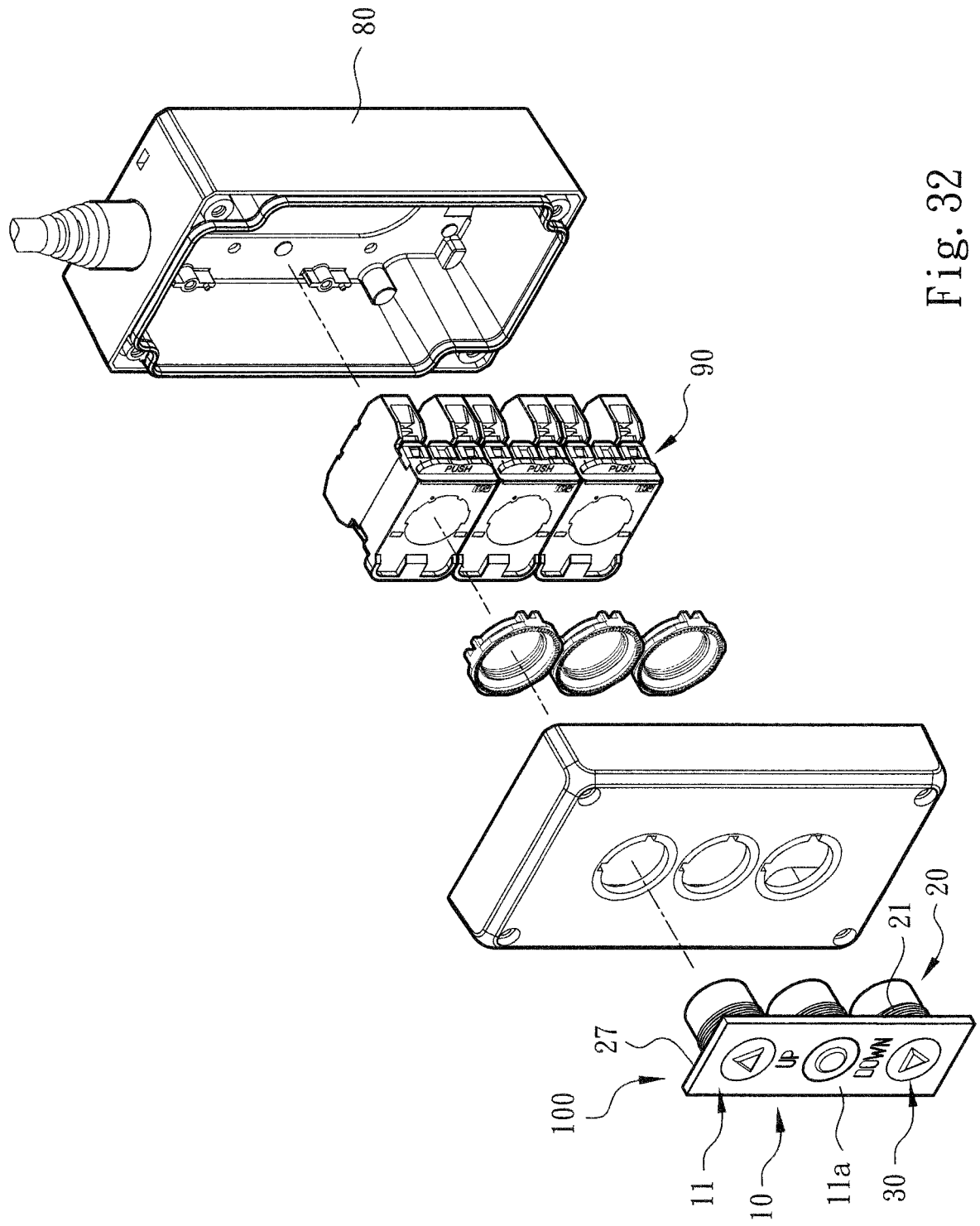
FIG. 32 is a perspective exploded view of an embodiment of the present invention, showing the structures of the main body, the switch component (or wire connection terminal), the substrate and the case.

FIG. 32 shows that the main body 100 is assembled with another structural form of switch component 90 (or wire connection terminal). The main body 100 cooperates with the substrate 40 and the case 80 to receive (or secure) the nonmetal belly sections 20 and the switch components 90.

Figure 33:
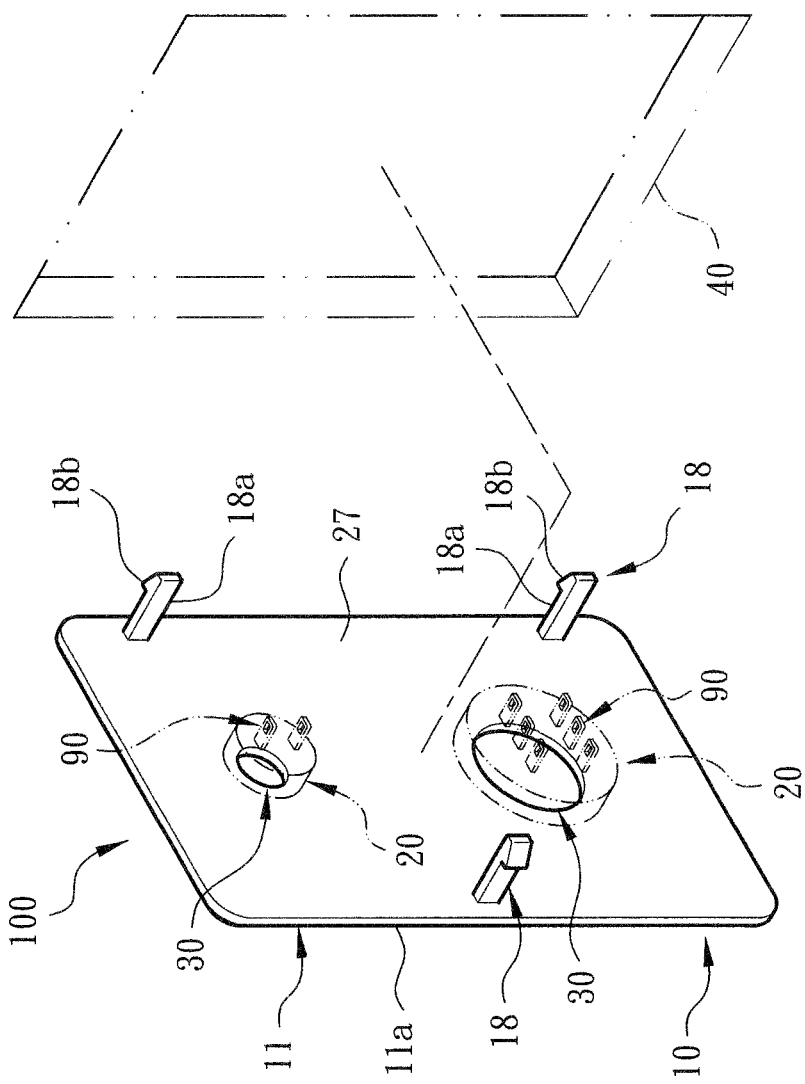
FIG. 33 is a perspective view of an embodiment of the present invention, showing that the main body is formed with latch sections for latching with the substrate.

FIG. 33 shows a structural form that the main body 100 is formed with multiple latch sections 18 latched with the substrate 40. The latch section 18 has an (elastic) arm section 18a (perpendicularly) protruding from the main body 100 and a hook section 18b formed at the tail end of the arm section 18a. Accordingly, the arm section 18a cooperates with the hook section 18b to latch on the substrate 40.

To speak representatively, in the condition that the structure is simplified and the manufacturing is facilitated, in comparison with the conventional switch device, the switch seat body assembling structure of the present invention has the following advantages:

1. The main body 100 and the relevant component structures have been redesigned in use and operation form to be different from the conventional switch device. For example, the main body 10 includes a complex structure of metal head section 10 in the form of a thin sheet structure and a nonmetal belly section 20. The first wall 11, the second wall 12 and/or the subsidiary wall 13 of the metal head section 10 together define the space 35. The nonmetal belly section 20 fills the space 35 to entirely connect with the first wall 11, the second wall 12 and/or the subsidiary wall 13 so as to facilitate the manufacturing and processing. This obviously improves the shortcomings of the conventional switch device that the seat body is entirely made of metal material or the entire metal column body is lathed and milled so that the manufacturing/processing is troublesome, time-consuming and material-wasting and the cost is higher. Moreover, the structural design of the present invention obviously can reduce the waste metal material to solve the environmental pollution problem and promote/upgrade the industry.
2. The second wall 12 of the main body 100 or the metal head section 11 is inclined from the eccentric axis y (and/or a closure body 31 is disposed in the shaft hole 30). Such structural form makes the nonmetal belly section 20 enclose the outer surface 12a and inner surface 12b of the second wall 12 to achieve secure connection effect. In addition, the metal head section 10 is in the form of a thin sheet structure so that it is easy to press and shape the metal head section 10 into various geometrical configurations or structural forms. Therefore, in accordance with the practical use situation, an operator can selectively use different structural form of main body 100 to assemble with different types of switch components 90, light source components 95 or wire connection terminals) to widen the application range. Also, the first wall 11 and/or the tray section 27 of the nonmetal belly section 20 are formed with large-area structure so that the (solid) figure (character) section 45 can be easily printed on thereon to achieve decoration/indication effect.

In conclusion, the switch seat body assembling structure of the present invention is effective and different from the conventional switch device in space form. The switch seat body assembling structure of the present invention is inventive, greatly advanced and advantageous over the conventional switch device.

The above embodiments are only used to illustrate the present invention, not intended to limit the scope thereof. Many modifications of the above embodiments can be made without departing from the spirit of the present invention.

What is claimed is:

1. A switch seat body assembling structure comprising:
a main body composed of a metal head section in a form of a thin sheet structure and a nonmetal belly section, the main body being defined with an eccentric axis y deviating from a central position of the main body, the metal head section having a first wall having a geometrical configuration, a second wall connected with the first wall and at least one shaft hole positioned on the eccentric axis y, which can be directly pressed into the geometrical configuration, the first wall being normal to the eccentric axis y or inclined from the eccentric axis y, the second wall being parallel to the eccentric axis y or inclined from the eccentric axis y, whereby the first and second walls contain an angle, which is an acute angle, a right angle or an obtuse angle, each of the first and second walls having outer surfaces and inner surfaces the first and second walls together defining therebetween a space, the nonmetal belly section being formed with an internal space, the nonmetal belly section being formed with a tray section filling the space to at least connect with entire sections of the inner surface of the first wall and the outer surface of the second wall, whereby the metal head section and the nonmetal belly section are connected as an integrated body structure.

2. The switch seat body assembling structure as claimed in claim 1, wherein the internal space of the nonmetal belly sections cooperates with the shaft hole to mount one of a switch component, a light source component and a wire connection terminal, the nonmetal belly sections downward extending in a direction in parallel to the eccentric axis y, a shoulder section being disposed in the internal space of the nonmetal belly sections, an area of the first wall being larger than, equal to or smaller than a cross-sectional area of the shaft hole.

3. The switch seat body assembling structure as claimed in claim 2, wherein a closure body is disposed in the shaft hole of the metal head section, the closure body being a structure with a U-shaped cross section, the closure body including a base section on an upper side and a wall section perpendicularly connected with the base section, the wall section cooperating with the nonmetal belly section to respectively compress the inner surface and outer surface of the second wall of the metal head section, whereby the nonmetal belly section encloses the second wall, at least one of the base section and the wall section of the closure body being transparent.

4. The switch seat body assembling structure as claimed in claim 3, wherein the closure body and the nonmetal belly section are integrally formed, one of the switch component and the light source component having an insertion section in a form of a protrusion structure or a hole structure, the nonmetal belly section being formed with a restriction section in a form of a hole structure or a protrusion structure for correspondingly assembling with the insertion section.

5. The switch seat body assembling structure as claimed in claim 2, wherein another end of the first wall is formed and connected with a subsidiary wall, the subsidiary wall being formed in such a manner that the other end of the first wall is bent toward a lower side to extend in the direction in parallel to or inclined from the eccentric axis y, the subsidiary wall having an outer surface and an inner surface, the first wall, the second wall and the subsidiary wall together defining the space, the nonmetal belly section being entirely connected with the inner surface of the subsidiary wall, at least one of the first wall 44 and the tray section permitting an indicia figure section to be arranged thereon.

6. The switch seat body assembling structure as claimed in claim 5, wherein the second wall of the metal head section obliquely extends to the outer side or inner side of the main body in the direction inclined from the eccentric axis y, whereby the first wall and the second wall contain the angle, which is the acute angle or the obtuse angle, a section of the nonmetal belly section cooperating with the nonmetal belly section to respectively compress the inner surface and outer surface of the second wall of the metal head section, whereby the nonmetal belly section encloses at least a part of the second wall.

7. The switch seat body assembling structure as claimed in claim 6, wherein the first wall of the metal head section extends in a direction normal to the eccentric axis y, the other end of the first wall extending to outer side of the main body to form the subsidiary wall inclined from the eccentric axis y, whereby the subsidiary wall has a head section, a tail end of the head section of the subsidiary wall extending to outer side of the main body in a direction normal to the eccentric axis y to form a connection section whereby the metal head section 10 and the tray section of the nonmetal belly section are respectively formed with at least two-stage structure, the first wall and the head section of the subsidiary wall containing an angle, which is an acute angle, a right angle or an obtuse angle, the head section of the subsidiary wall and the connection section containing angle, which is an acute angle, a right angle or an obtuse angle.

8. The switch seat body assembling structure as claimed in claim 7, wherein the tray section of the nonmetal belly section at least partially extends to outer side of the main body and protrudes from the connection section, the portion of the tray section protruding from the connection section being defined as a protrusion portion, the indicia section being arranged on the protrusion portion.

9. The switch seat body assembling structure as claimed in claim 5, wherein the first wall of the main body is formed with a connection section, the connection section have a structural form made in such a manner that the first wall is pressed to a lower side to form at least one hole structure and a plate body section formed on at least one side of the hole structure.

10. The switch seat body assembling structure as claimed in claim 9, wherein an indicia section is disposed in the hole structure or the figure indicia section is arranged on the tray section of the nonmetal belly section in a position corresponding to the hole structure.

11. The switch seat body assembling structure as claimed in claim 5, wherein the first wall of the metal head section extends in a direction normal to the eccentric axis y, the other end of the first wall extending to outer side of the main body to form the subsidiary wall inclined from the eccentric axis y, whereby the subsidiary wall has a head section, a tail end of the head section of the subsidiary wall extending to outer side of the main body in a direction normal to the eccentric axis y to form a connection section, whereby the metal head section 10 and the tray section of the nonmetal belly section are respectively formed with at least two-stage structure, the first wall and the head section of the subsidiary wall containing an angle, which is an acute angle, a right angle or an obtuse angle, the head section of the subsidiary wall and the connection section containing angle, which is an acute angle, a right angle or an obtuse angle.

12. The switch seat body assembling structure as claimed in claim 11, wherein the tray section of the nonmetal belly section at least partially extends to outer side of the main body and protrudes from the connection section, the portion of the tray section protruding from the connection section being defined as a protrusion portion, the indicia section being arranged on the protrusion portion.

13. The switch seat body assembling structure as claimed in claim 12, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body whereby the assembling section has the form of an L-shaped plate body structure.

14. The switch seat body assembling structure as claimed in claim 11, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall 2 and a subsidiary section perpendicularly bent from the base section to protrude in a direction to outer side of the main body, whereby the assembling section has the form of an L-shaped plate body structure.

15. The switch seat body assembling structure as claimed in claim 2, wherein the second wall of the metal head section obliquely extends to an outer side or inner side of the main body in the direction inclined from the eccentric axis y, whereby the first wall and the second wall contain the angle, which is the acute angle or the obtuse angle, a section of the nonmetal belly section cooperating with the nonmetal belly section to respectively compress the inner surface and outer surface of the second wall of the metal head section, whereby the nonmetal belly section encloses at least a part of the second wall.

16. The switch seat body assembling structure as claimed in claim 2, wherein the main body has multiple shaft holes and multiple nonmetal belly sections are connected with the metal head section corresponding to the shaft holes for together mounting at least one of a switch component and a light source component disposed on the substrate, the substrate cooperating with a case to receive the main body.

17. The switch seat body assembling structure as claimed in claim 1, wherein another end of the first wall is formed and connected with a subsidiary wall, the subsidiary wall being formed in such a manner that the other end of the first wall is bent toward a lower side to extend in a direction in parallel to or inclined from the eccentric axis y, the subsidiary wall having an outer surface and an inner surface, the first wall, the second wall and the subsidiary wall together defining the space, the nonmetal belly section 20 being entirely connected with the inner surface of the subsidiary wall, at least one of the first wall and the tray section permitting an indicia section to be arranged thereon.

18. The switch seat body assembling structure as claimed in claim 17, wherein the nonmetal belly section is a column-shaped body structure with a thread on a surface, the main body being assembled with a substrate, whereby the nonmetal belly section cooperates with the subsidiary wall of the metal head section to press and connect with the substrate.

19. The switch seat body assembling structure as claimed in claim 17, wherein the second wall of the metal head section obliquely extends to the outer side or inner side of the main body in the direction inclined from the eccentric axis y, whereby the first wall and the second wall contain the angle, which is the acute angle or the obtuse angle, a section of the nonmetal belly section cooperating with the nonmetal belly section to respectively compress the inner surface and outer surface of the second wall of the metal head section, whereby the nonmetal belly section encloses at least a part of the second wall.

20. The switch seat body assembling structure as claimed in claim 19, wherein the first wall of the metal head section extends in a direction normal to the eccentric axis y, the other end of the first wall extending to outer side of the main body to form the subsidiary wall inclined from the eccentric axis y, whereby the subsidiary wall has a head section, a tail end of the head section of the subsidiary wall extending to outer side of the main body in a direction normal to the eccentric axis y to form a connection section, whereby the metal head section and the tray section of the nonmetal belly section are respectively formed with at least two-stage structure, the first wall and the head section of the subsidiary wall containing an angle, which is an acute angle, a right angle or an obtuse angle, the head section of the subsidiary wall and the connection section containing angle, which is an acute angle, a right angle or an obtuse angle.

21. The switch seat body assembling structure as claimed in claim 20, wherein the tray section of the nonmetal belly section at least partially extends to outer side of the main body and protrudes from the connection section, the portion of the tray section 2 protruding from the connection section being defined as a protrusion portion, the indicia section being arranged on the protrusion portion.

22. The switch seat body assembling structure as claimed in claim 17, wherein the first wall of the main body is formed with a connection section, the connection section have a structural form made in such a manner that the first wall is pressed to a lower side to form at least one hole structure and a plate body section 16 formed on at least one side of the hole structure.

23. The switch seat body assembling structure as claimed in claim 22, wherein an indicia section is disposed in the hole structure or the figure indicia section is arranged on the tray section of the nonmetal belly section in a position corresponding to the hole structure.

24. The switch seat body assembling structure as claimed in claim 17, wherein the first wall of the metal head section extends in a direction normal to the eccentric axis y, the other end of the first wall extending to outer side of the main body to form the subsidiary wall inclined from the eccentric axis y, whereby the subsidiary wall has a head section, a tail end of the head section of the subsidiary wall extending to outer side of the main body in a direction normal to the eccentric axis y to form a connection section, whereby the metal head section and the tray section of the nonmetal belly section are respectively formed with at least two-stage structure, the first wall and the head section of the subsidiary wall containing an angle, which is an acute angle, a right angle or an obtuse angle, the head section of the subsidiary wall and the connection section containing angle, which is an acute angle, a right angle or an obtuse angle.

25. The switch seat body assembling structure as claimed in claim 24, wherein the tray section of the nonmetal belly section at least partially extends to outer side of the main body and protrudes from the connection section, the portion of the tray section 2 protruding from the connection section being defined as a protrusion portion, the indicia section being arranged on the protrusion portion.

26. The switch seat body assembling structure as claimed in claim 25, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body, whereby the assembling section has the form of an L-shaped plate body structure.

27. The switch seat body assembling structure as claimed in claim 24, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body, whereby the assembling section has the form of an L-shaped plate body structure.

28. The switch seat body assembling structure as claimed in claim 17, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body, whereby the assembling section has the form of an L-shaped plate body structure.

29. The switch seat body assembling structure as claimed in claim 1, wherein the second wall of the metal head section obliquely extends to an outer side or inner side of the main body in a direction inclined from the eccentric axis y, whereby the first wall and the second wall contain the angle, which is the acute angle or the obtuse angle, a section of the nonmetal belly section 20 cooperating with the nonmetal belly section to respectively compress the inner surface and outer surface of the second wall of the metal head section, whereby the nonmetal belly section encloses at least a part of the second wall.

30. The switch seat body assembling structure as claimed in claim 29, wherein another end of the first wall is formed and connected with a subsidiary wall, the subsidiary wall being formed in such a manner that the other end of the first wall is bent toward a lower side to extend in the direction in parallel to or inclined from the eccentric axis y, the subsidiary wall having an outer surface and an inner surface, the first wall, the second wall and the subsidiary wall together defining the space, the nonmetal belly section being entirely connected with the inner surface of the subsidiary wall.

31. The switch seat body assembling structure as claimed in claim 30, wherein the nonmetal belly section is a column-shaped body structure with a thread on a surface, the main body being assembled with a substrate, whereby the nonmetal belly section cooperates with the subsidiary wall of the metal head section to press and connect with the substrate.

32. The switch seat body assembling structure as claimed in claim 29, wherein the first wall of the main body is formed with a connection section, the connection section have a structural form made in such a manner that the first wall is pressed to a lower side to form at least one hole structure and a plate body section formed on at least one side of the hole structure.

33. The switch seat body assembling structure as claimed in claim 32, wherein an indicia section is disposed in the hole structure or the indicia section is arranged on the tray section of the nonmetal belly section in a position corresponding to the hole structure.

34. The switch seat body assembling structure as claimed in claim 29, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body, whereby the assembling section has the form of an L-shaped plate body structure.

35. The switch seat body assembling structure as claimed in claim 1, wherein the first wall of the main body is formed with a connection section, the connection section have a structural form made in such a manner that the first wall is pressed to a lower side to form at least one hole structure and a plate body section formed on at least one side of the hole structure.

36. The switch seat body assembling structure as claimed in claim 35, wherein an indicia section is disposed in the hole structure or the indicia section is arranged on the tray section of the nonmetal belly section in a position corresponding to the hole structure.

37. The switch seat body assembling structure as claimed in claim 1, wherein the metal head section is formed with two shaft holes, the nonmetal belly section being formed with two internal spaces corresponding to the two shaft holes, the second wall of the metal head section being formed with at least one assembling section, multiple assembling sections protruding from the lower section of the second wall in a direction in parallel to the eccentric axis y, each assembling section including a base section coplanar with the second wall and a subsidiary section perpendicularly bent from the base section to protrude in a direction to outer side of the main body, whereby the assembling section has the form of an L-shaped plate body structure.

38. The switch seat body assembling structure as claimed in claim 1, wherein the second wall of the metal head section is formed with at least one assembling section, the assembling section having the form of a hole structure, the nonmetal belly section being formed with an insertion section protruding to the eccentric axis y, whereby when the nonmetal belly section is assembled with the metal head section, the nonmetal belly section is plugged into the assembling section of the metal head section and the insertion section is inserted with the assembling section.

39. The switch seat body assembling structure as claimed in claim 1, wherein the main body has multiple shaft holes and multiple nonmetal belly sections are connected with the metal head section corresponding to the shaft holes for together mounting at least one of a switch component and a light source component disposed on the substrate, the substrate cooperating with a case to receive the main body.

40. The switch seat body assembling structure as claimed in claim 1, wherein the main body is formed with multiple latch sections, each latch section having an elastic arm section perpendicularly protruding from the main body and a hook section formed at a tail end of the arm section.

* * * * *